Aug. 24, 1943.   R. I. WILCOX   2,327,753
AUTOMATIC PHONOGRAPH
Filed Jan. 10, 1940   12 Sheets-Sheet 2
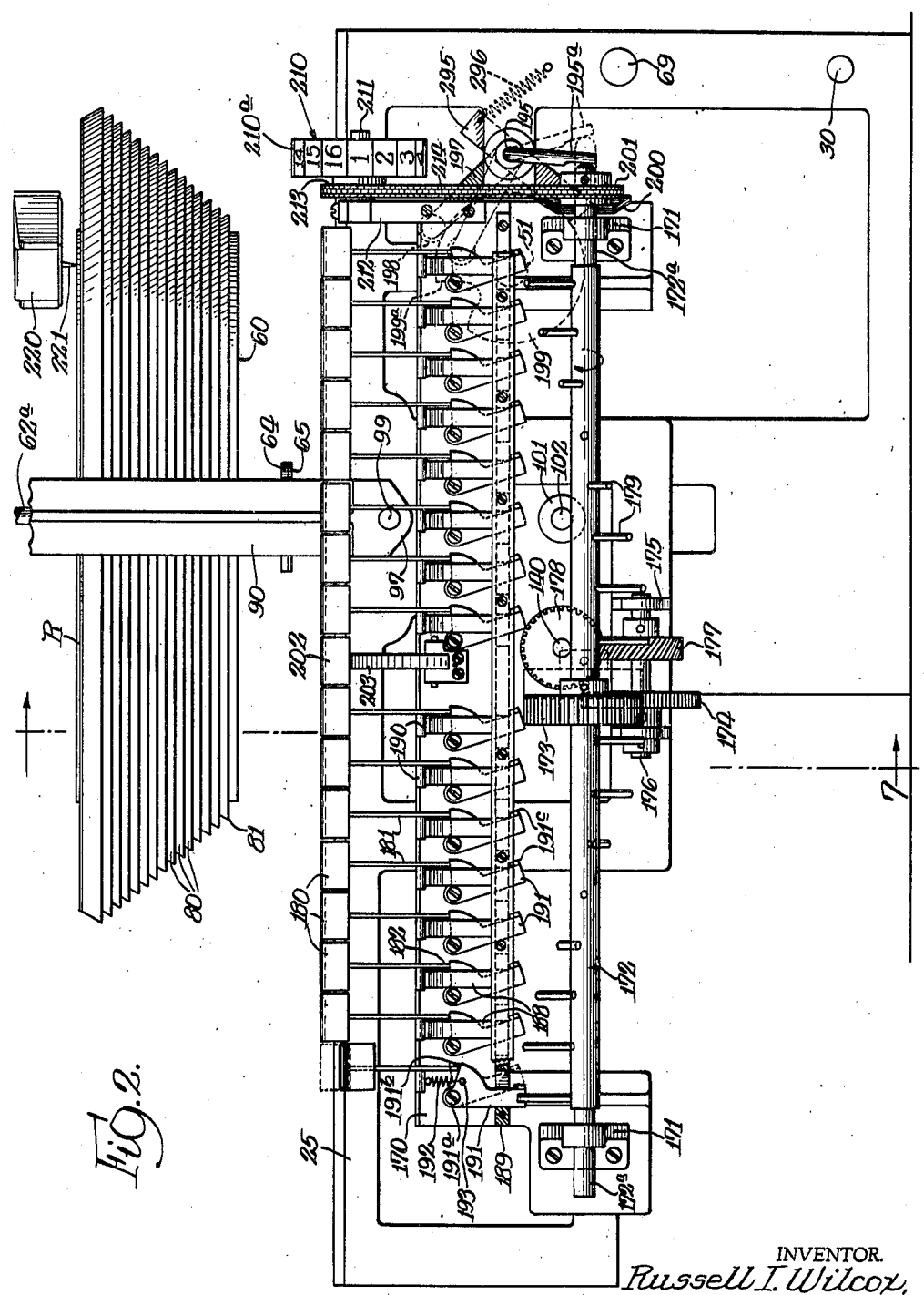
INVENTOR.
Russell I. Wilcox,
BY
Davis, Lindsey, Smith & Shonts
ATTORNEYS.

Aug. 24, 1943.  R. I. WILCOX  2,327,753
AUTOMATIC PHONOGRAPH
Filed Jan. 10, 1940  12 Sheets-Sheet 3
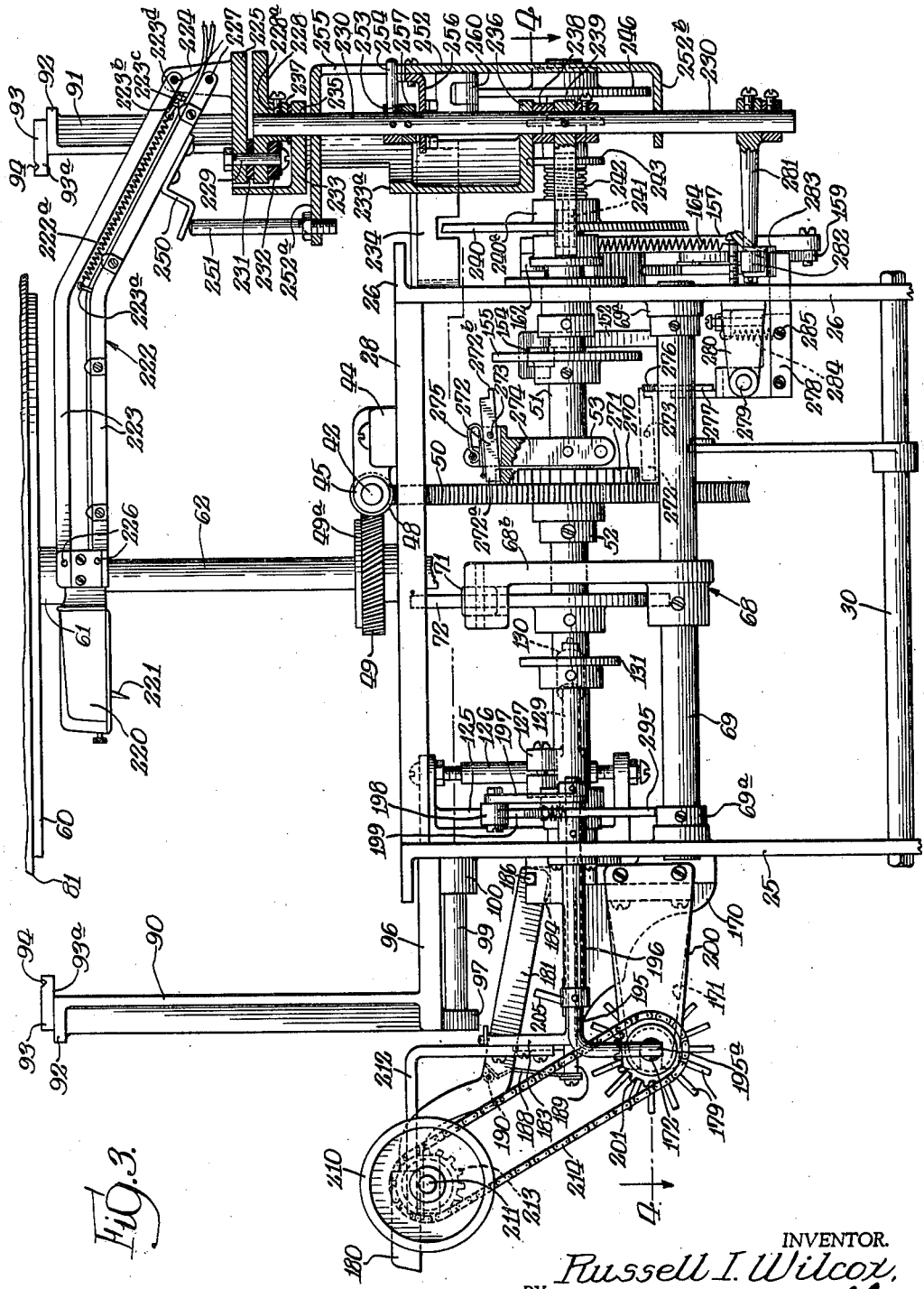
INVENTOR.
Russell I. Wilcox,
BY Davis, Lindsey, Smith & Shorts
ATTORNEYS.

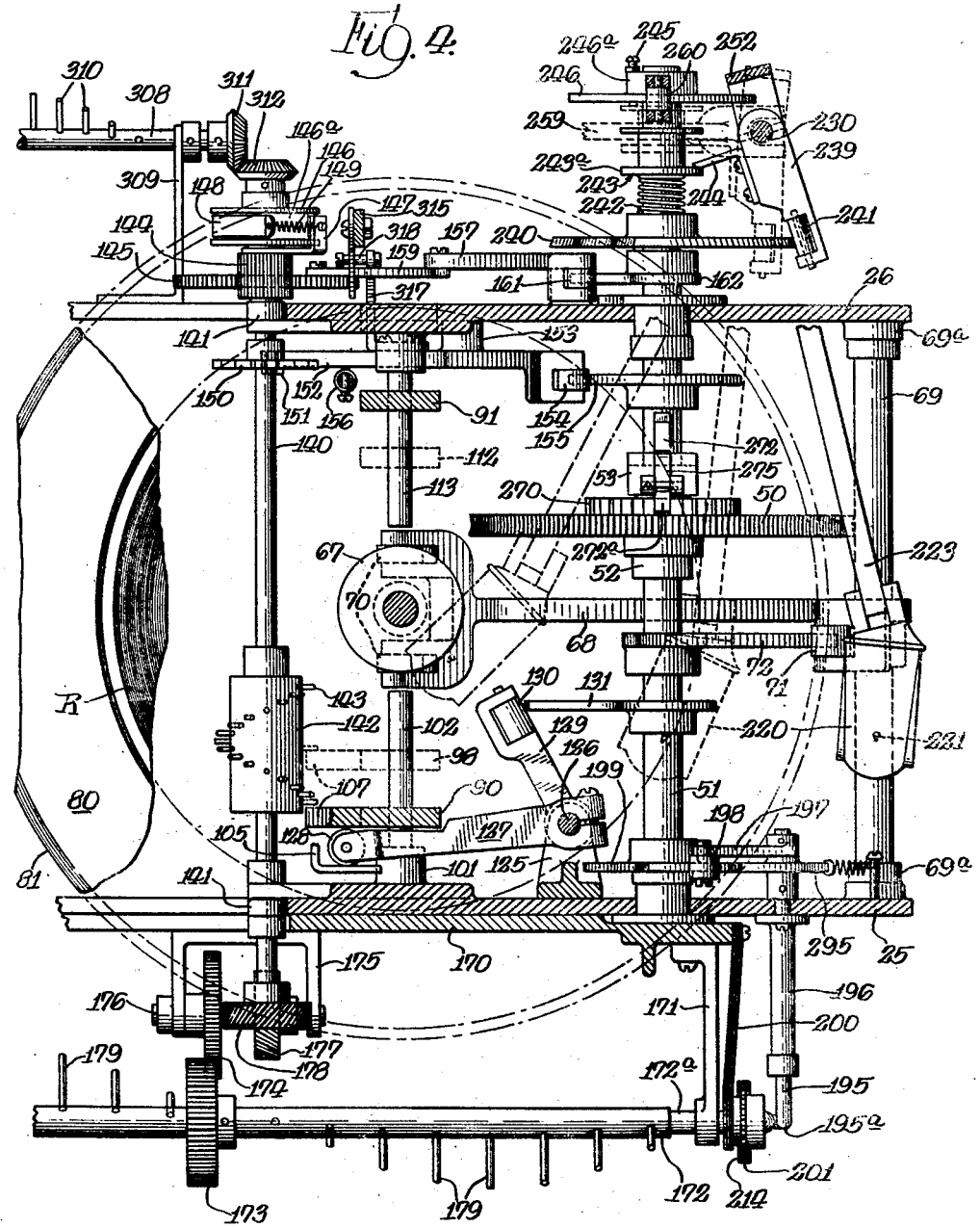

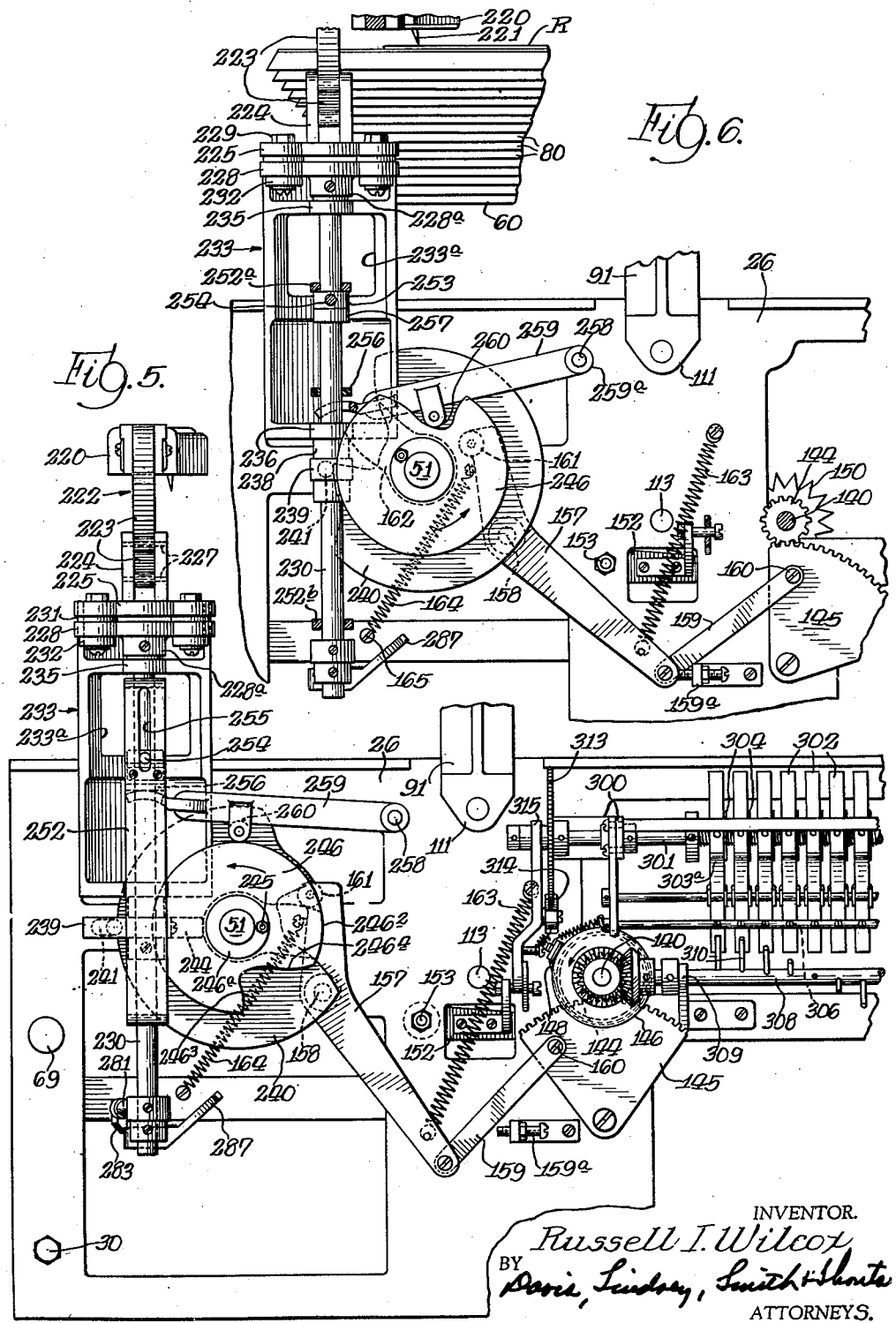

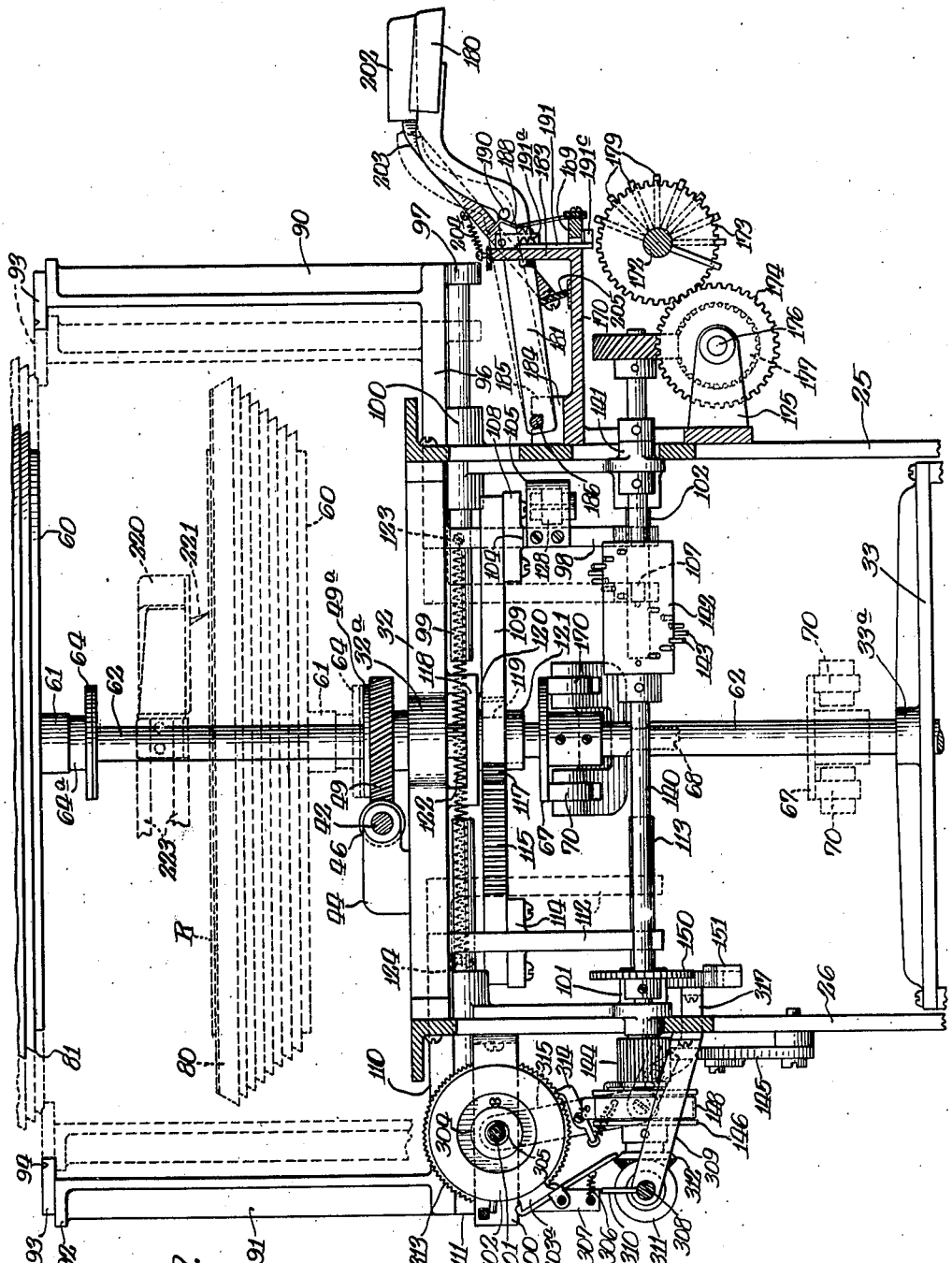

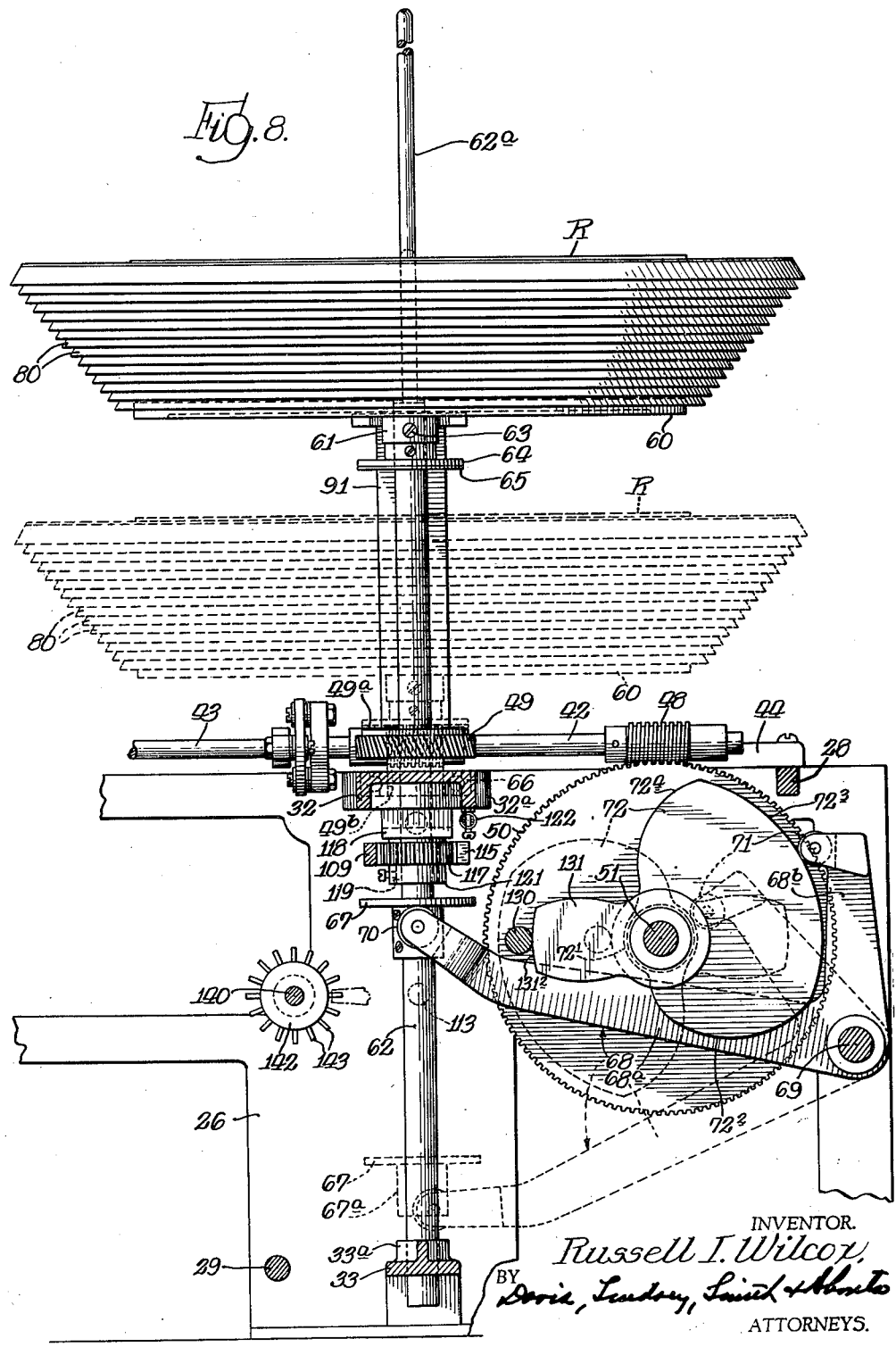

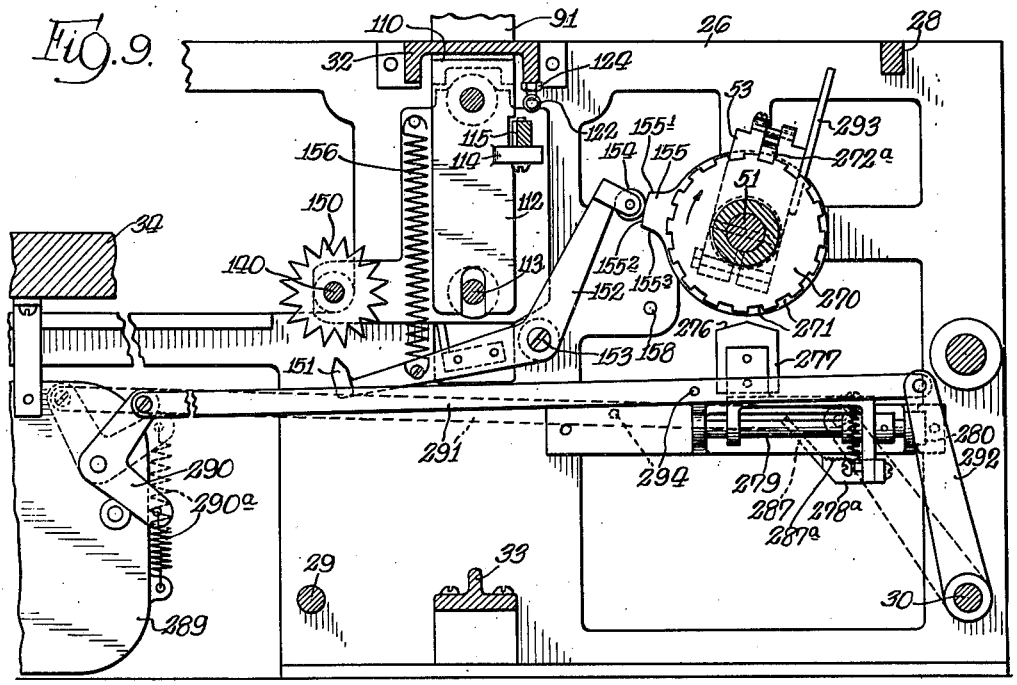
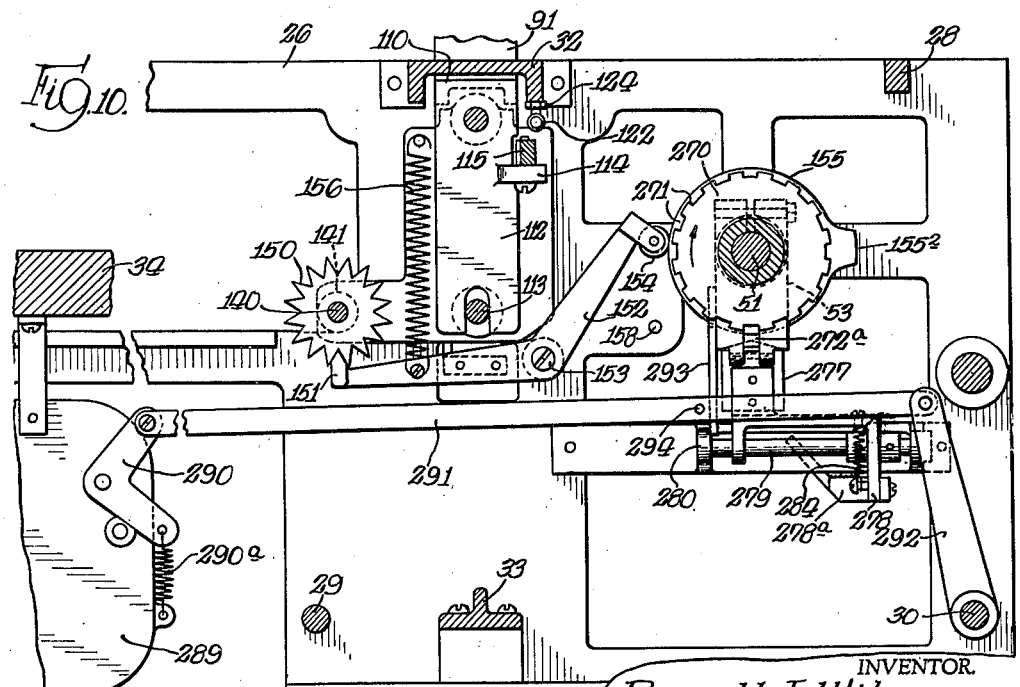

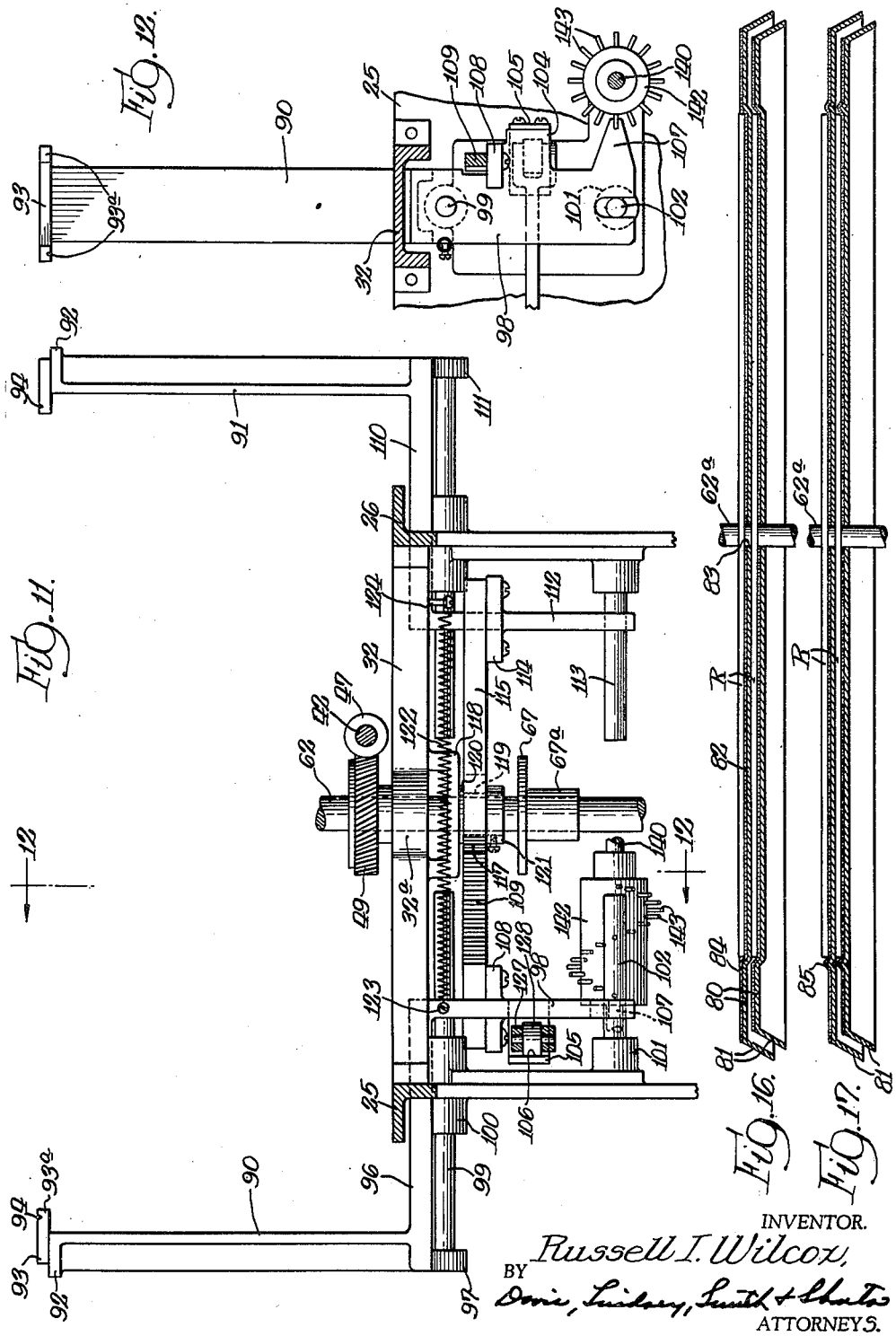

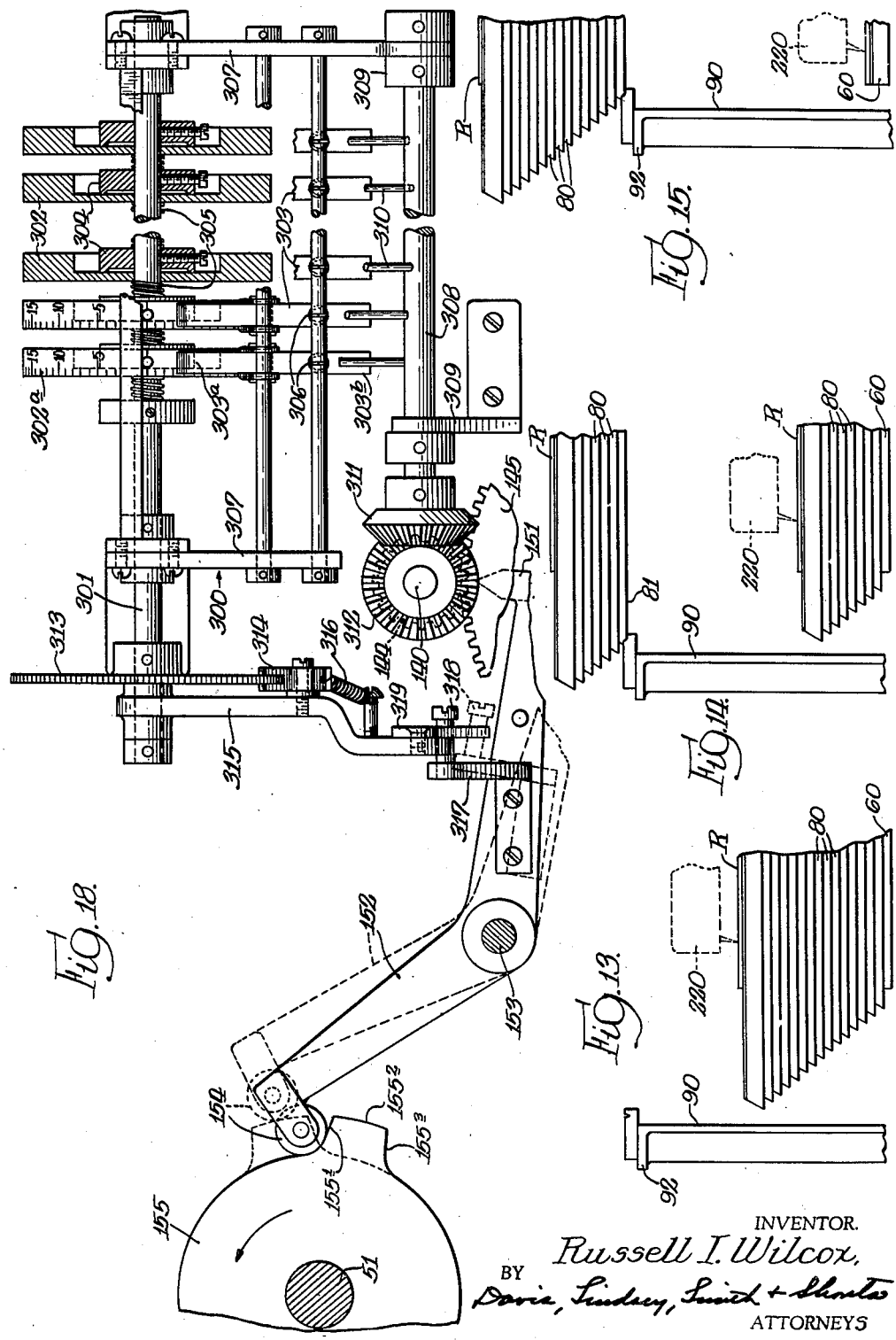

Aug. 24, 1943.   R. I. WILCOX   2,327,753
AUTOMATIC PHONOGRAPH
Filed Jan. 10, 1940   12 Sheets-Sheet 11

INVENTOR.
Russell I. Wilcox,
BY Davis, Lindsey, Smith & Shonts
ATTORNEYS.

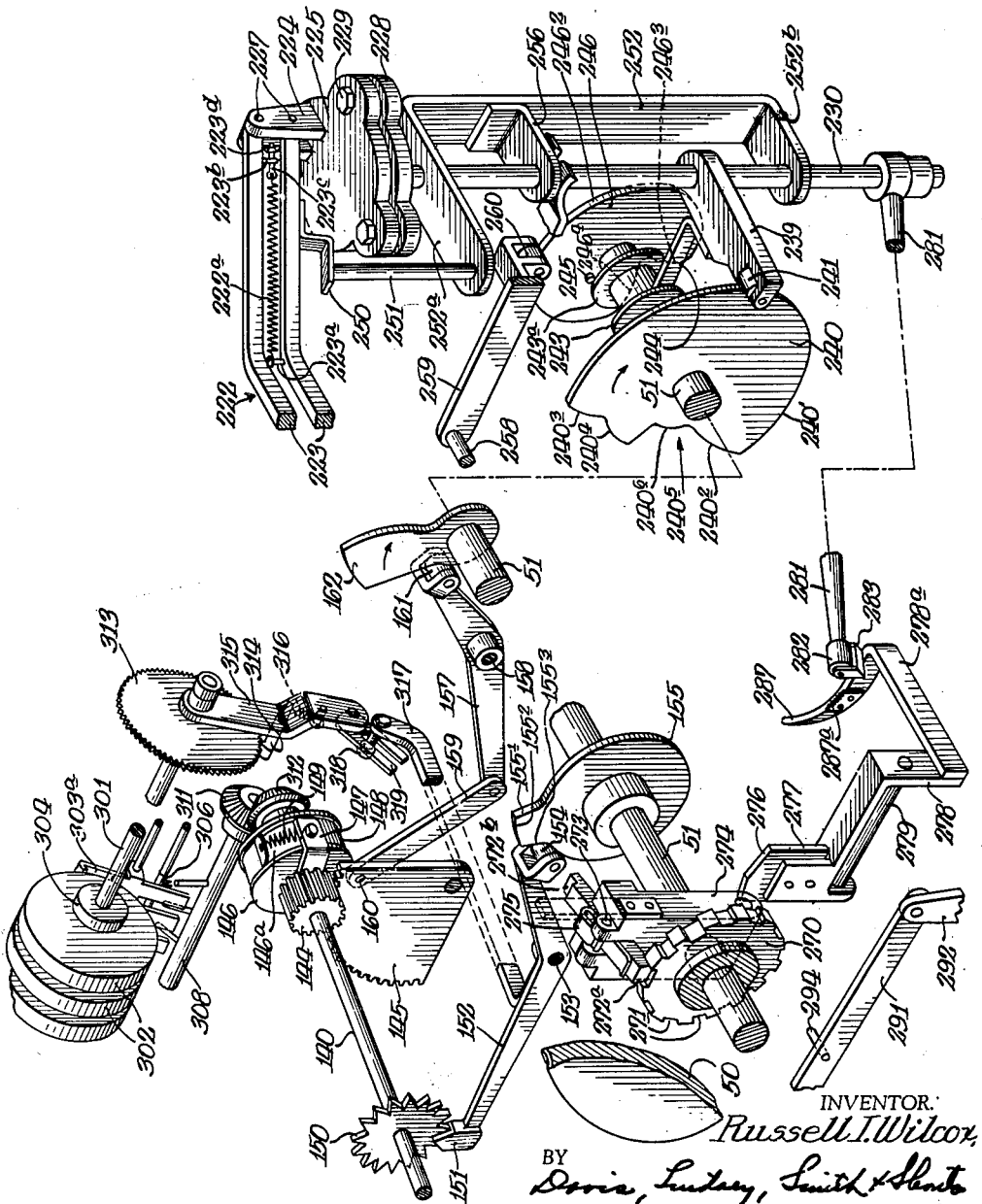

UNITED STATES PATENT OFFICE 2,327,753

AUTOMATIC PHONOGRAPH

Russell I. Wilcox, Brookfield, Ill., assignor to
Herbert C. Johnson, Wilmette, Ill.

Application January 10, 1940, Serial No. 313,183

22 Claims. (Cl. 274—10)

My invention relates to automatic phonographs and it has to do particularly with phonographs of the multi-selective type adapted for the selection and playing of one or any desired combination of records.

The objects of my invention are:

To provide an improved automatic phonograph of the foregoing character;

To provide an improved automatic phonograph of the stack-splitting type;

To provide improved record-selecting mechanism;

To provide improved record-handling mechanism;

To provide improved tone arm and tone arm control mechanism;

To provide an automatic phonograph of the foregoing character which is of simplified construction, which embodies a reduced number of parts, which embodies parts that may be easily and cheaply made and assembled, and which is adapted to perform its intended functions in a highly efficient manner;

To provide in a machine of the foregoing character novel record-handling mechanism which eliminates the use of a separate storage magazine;

To provide novel means for supporting each record individually, such means including a plurality of trays, one for each record, supported in stacked relation, such trays progressively increasing in diameter from one end of the stack to the other, thereby providing a record stack of frusto-conical shape;

To provide a machine of the foregoing character wherein the positioning of a selected record or any combination thereof in playing position upon the turntable is controlled in part by the shape of the record-supporting tray stack and in part by reciprocation of the turntable;

To provide a machine of the foregoing character wherein a plurality of record-supporting trays are normally supported in stacked relation upon a rotatable record-supporting turntable, one or any combination of selected records being exposed in succession to reproducer mechanism for playing by reciprocating the turntable between upper and lower limits and stationarily interposing a tray support at such a position along the path of movement of the record stack that it engages the periphery of the particular record tray immediately above the tray carrying the selected record when the turntable is reciprocated in one direction, whereby full reciprocatory movement of the turntable exposes a selected record to the reproducer mechanism;

To provide selector mechanism embodying a rotatable selector shaft and improved means for actuating the same in automatically selecting a record for play;

To provide improved mechanism for effecting swinging movements of the tone arm structure;

To provide improved means for automatically canceling a record selection;

To provide improved counting means for indicating the number of times any particular record is played;

To provide improved clutch mechanism for connecting main drive mechanism with the cam shaft;

To provide an improved cycle of operation which insures proper sound reproduction when employing reproducer and amplifier mechanism embodying operating parts requiring a preliminary so-called heating action;

To provide improved motor switch operating means for stopping a machine at the end of a cycle; and To provide a machine embodying the foregoing features in compact form and which may be mounted in a much smaller cabinet and may be sold at a much less price than prior machines.

Other objects and advantages will become apparent from the following description, and by reference to the drawings wherein,

Drawings

Figure 1 is a sectional view taken horizontally through the upper portion of a cabinet structure, which figure includes a top plan view of mechanism (less turntable) embodying my invention and housed by the cabinet structure, such mechanism being shown in a mid-cycle position with the turntable raised and selector mechanism set ready for positioning the number 1 record for play when stack-splitting means is operated and the turntable is lowered;

Fig. 2 is an enlarged front elevational view of the structure (less cabinet) shown in Fig. 1, which view clearly illustrates the key-actuated portion of the selector mechanism;

Fig. 3 is an enlarged sectional view taken substantially on line 3—3 of Fig. 1, illustrating the tone arm lifting and swinging mechanism in section and the remainder of the structure in elevation;

Fig. 4 is a horizontal section taken substantially on line 4—4 of Fig. 3, the record-supporting structure and the tone arm structure (in full and dotted lines) being superimposed thereon to more clearly illustrate the operating relationship thereof;

Fig. 5 is an enlarged fragmental view of the rear, right-hand portion of the machine as illustrated in Fig. 1, which view illustrates the tone arm lifting and swinging mechanism in its raised and inactive condition, the selector mechanism in an intermediate stage of operation for setting the structure for the playing of a selected record, and the counting mechanism in a normal, inactive condition;

Fig. 6 is a view similar to Fig. 5, except illustrating the tone arm operating mechanism in operative, playing position with respect to a record and the selector mechanism in its normal, inactive condition ready for operation to make a new record selection;

Figure 1:
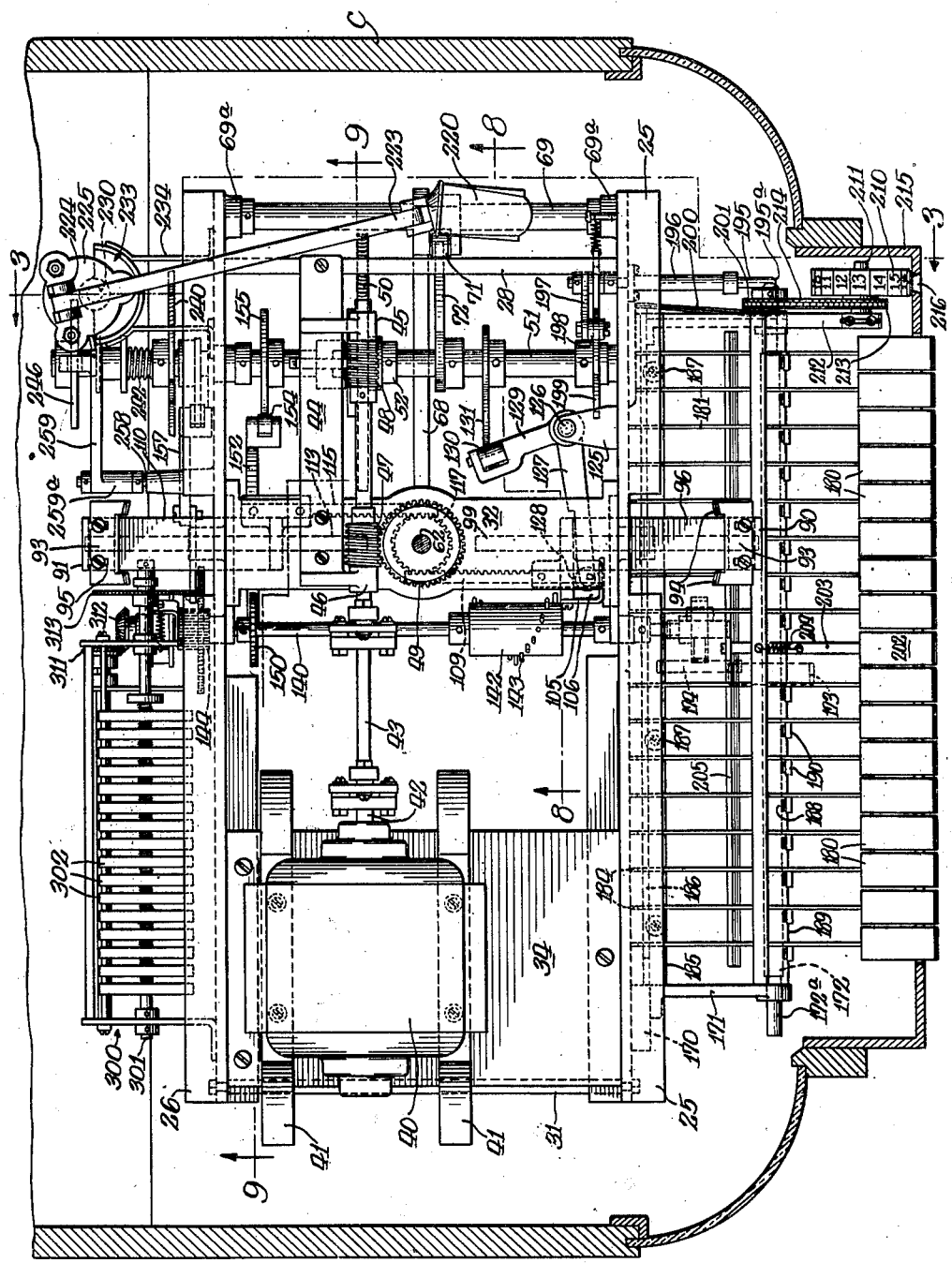
Figure 19:
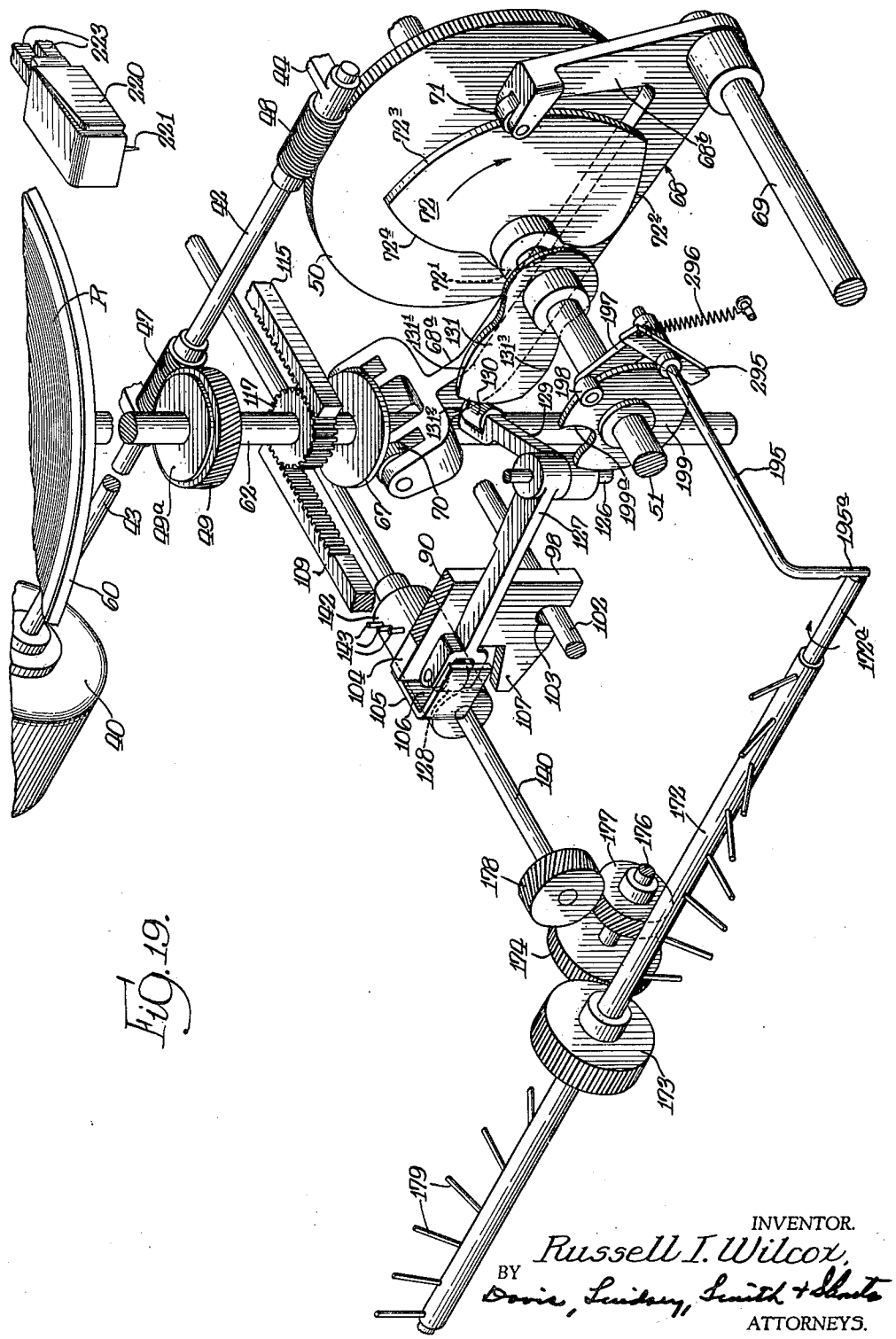

Fig. 7 is a section taken substantially on line 7—7 of Fig. 2, and illustrating, in full lines, the mechanism set in position ready for selecting the number 8 record for play when the turntable is lowered and illustrating in dotted lines the parts in position for playing the number 8 record;

Fig. 8 is an enlarged, fragmental sectional view taken substantially on line 8—8 of Fig. 1 and illustrating, in full lines, the turntable, its operating mechanism and a record stack in an elevated position of the turntable and also illustrating, in dotted lines, the lowered operating position of the turntable with the record stack thereon;

Fig. 9 is an enlarged fragmental sectional view taken substantially on line 9—9 of Fig. 1, in which view I illustrate the selector shaft locking mechanism in an unlocked condition, the motor switch operating mechanism in a switch-closing position in full lines and in a switch-opening position in dotted lines, and the clutch mechanism for connecting the main drive with the cam shaft in a drive-connected condition;

Fig. 10 is a view similar to Fig. 9, except illustrating the selector shaft locking mechanism in a locked condition and the clutch mechanism in a disconnected condition;

Fig. 11 is a separated view of the arm unit employed for stack-splitting purposes;

Fig. 12 is a face view of the left-hand arm shown in Fig. 11, looking in the direction of the arrows of line 12—12 in Fig. 11;

Fig. 13 is a fragmental, somewhat diagrammatic view illustrating the turntable with a record stack supported thereon and in condition for playing the uppermost or number 1 record;

Fig. 14 is a view similar to Fig. 13, except showing the parts in stack-splitting relation for playing, for example, the number 8 record;

Fig. 15 is a view similar to Figs. 13 and 14, except illustrating the parts in condition for playing the bottom or number 16 record;

Fig. 16 is a separated, enlarged sectional view of certain of the record-supporting trays;

Fig. 17 is a view similar to Fig. 16, except illustrating a modified form of tray structure;

Fig. 18 is an enlarged fragmentary elevational view, partially in section, of the counting mechanism; and Figs. 19 and 20 are isometric views illustrating, somewhat diagrammatically, the cam structure of the machine and the parts operated thereby.

*General*

A machine embodying my invention includes a turntable which normally supports a plurality of records R in stacked relation, which is raised and lowered to effect splitting of the record stack, and which is rotatable for playing the selected record; selector mechanism by which the user may select, by suitable key actuation, any desired record or combination of a plurality of records to be played in one continuous operation; stack-splitting mechanism controlled by the selector mechanism and operative, through movement of the turntable, for splitting the stack of records at any desired point to expose any desired record for playing; tone arm and tone arm control mechanism by which the tone arm is raised and lowered, is swung into and out of playing position, and is released for movement under the control of the record grooves; driving mechanism including a driving motor, a driving shaft adapted to be connected to the turntable in the record-playing position of the latter, and a cam shaft adapted to be clutched to the drive shaft at a predetermined time during each cycle of operation; cam mechanism including a cam shaft having thereon a plurality of cam members so related that when the cam shaft is rotated the several operations of the machine are carried out in a predetermined cycle sequence; counting mechanism for registering the number of times any particular record is played; and switch-operating mechanism for controlling the operation of the driving motor.

The cam mechanism is so constructed and arranged that each cycle of operation includes the following operations in the sequence mentioned: When the driving motor is started, the drive is connected to the cam shaft and the tone arm is in its raised position above the record and partially swung toward an inactive position laterally of the turntable. The very first operation comprises movement of the tone arm to its initial, nonrecord-playing position; next the turntable, which is then in its lowermost and record-playing position, is raised to its uppermost position to restack all records on the turntable; next the stack-splitting mechanism (arms) spreads apart to its fullest extent in readiness to be reset according to a selection made through the selecting mechanism; next the stack-splitting mechanism is reset to a position wherein, in the downward lowering movement of the turntable, it will engage the periphery of and support the record tray immediately above the tray carrying the selected record, in turn supporting all the records above such selected record; next the turntable is lowered to accomplish the foregoing stack-splitting operation, the lowering movement of the turntable being continued until it reaches its lowermost and record-playing position; next the tone arm control mechanism swings the tone arm inwardly toward the record to a position directly above the first groove thereof and then drops the tone arm upon such record, releasing the tone arm from driving connection with the machine, the continued drive of the tone arm being through the grooves of the record; next the record is played; next, as soon as the tone arm moves far enough for the reproducer mechanism thereof to enter the record terminal groove, the tone arm actuates mechanism which raises the tone arm away from the record; next the switch mechanism is actuated to stop the driving motor, leaving the tone arm in its raised condition partially swung toward its position laterally of the turntable. As the foregoing cycle is carried out, the counting mechanism is actuated by the selector mechanism to register the fact that the selected record has been played.

The foregoing mechanisms are supported in compact fashion by a frame structure which may readily be mounted in a suitable cabinet C (Fig. 1). Such frame structure includes upstanding front and rear members 25, 26 (Figs. 1, 3, 4 and 7) which are supported and braced in spaced relation by a plurality of tie rods 28, 29, 30 and 31. These frame members are further supported and braced by upper and lower turntable spindle bearing supporting members 32, 33 (Figs. 3, 7 and 8), as well as by a motor-supporting plate 34 (Fig. 1). The several mechanisms above referred to will now be described.

*Driving mechanism (Figs. 1, 3, 4, 7 and 8)*

The driving mechanism includes a motor 40 (Fig. 1) mounted on the motor support 34 by spring suspension members 41. The motor 40 drives a shaft 42 having a flexible section 43, which accommodates any slight disalignment between the motor 40 and the other operating parts, as well as preventing transmission of motor vibration. The outer end portion of the drive shaft is supported by a bearing bracket 44 carried by the transverse frame-bracing members 28 and 32 and having spaced, laterally disposed bearings 45 and 46 in which the shaft 42 is journaled. Worm gears 47 and 48 are mounted upon the drive shaft 42 adjacent the bearing elements 45 and 46. The worm 47 (Figs. 1, 3, 7 and 8) drives a turntable rotating gear 49 and the worm 48 drives a gear 50 carried by a cam shaft 51 whereby the motor 40 constantly drives the gears 49 and 50 rotatably during the operation of the machine. The gear 50 is rotatably mounted upon the cam shaft 51 and is confined against axial displacement by a collar 52 (Figs. 1, 3 and 4) fixedly secured to the cam shaft 51 and by a clutch member 53 likewise fixedly secured to the cam shaft 51, the arrangement being such that the drive mechanism is drive-connected to the cam shaft 51 at predetermined times during each cycle of operation through suitable clutch mechanism which will be described in detail hereinafter. The drive mechanism rotatably drives a turntable unit through the gear 49, which unit will now be described.

*Turntable unit (Figs. 1, 2, 3, 7 and 8)*

The turntable unit includes a turntable 60 (Figs. 2, 3, 7 and 8) of circular form having an axial, depending hub 61 with an axial opening in which is received and secured, as by a set screw 63 (Fig. 8), a turntable spindle 62. The upper end 62a of the spindle is of reduced diameter and it projects axially upwardly through and above the turntable for supporting and guiding records and their supporting trays. The lower and enlarged portion of the spindle, beneath the hub 61, fixedly supports a circular friction disk 64 (Figs. 7 and 8). The under side of the disk 64 is provided with a leather or any other suitable friction face 65 which cooperates with the upper hub face 49a of the turntable drive gear 49, through the axis of which the turntable spindle 62 is freely slidable and rotatable. The turntable spindle 62 is not only supported by the gear 49 but it is further provided with bearing support by a bearing element 33a (Figs. 7 and 8) in the cross frame support 33. In this way, the spindle is maintained in a true axial position as it rotates and reciprocates.

The turntable driving gear 49 is rotatably supported by the cross frame member 32 (Figs. 7 and 8). To this end, the cross frame member 32 is provided with a central, annular bearing portion 32a supporting a ball-bearing unit 66 in which is received a depending hub portion 49b of the gear 49, whereby the gear 49 is mounted for rotation with a minimum of friction and wear. The spindle-carried friction shoe 65 affords sufficient friction engagement between the gear 49 and the turntable that, when the motor is operating, in turn rotating the gear 49, the turntable is rotated—particularly, in view of the fact that the turntable, in operation, supports one or more records affording sufficient weight to insure a proper frictional engagement for a substantially positive drive connection. The turntable itself, however, is of sufficient weight that, even though no records are supported thereon, it will be rotatably driven through the friction connection described. This friction connection facilitates the use of a reciprocable turntable unit and insures that the turntable unit will be rotated only when the turntable is in its lowermost record-playing position.

Reciprocation of the turntable between fixed upper and lower limits is accomplished by reciprocation of the turntable spindle 62 through cam-operated mechanism. Specifically, the spindle 62 has an elevating disk 67 secured thereto by its hub portion 67a at a point between the upper and lower spindle bearings. The position of this elevating disk is such that elevating mechanism may be operatively engaged beneath the disk for fully raising and lowering the spindle and, in turn, the turntable, between its limits. The raising and lowering means takes the form of a crank 68 (Figs. 1, 3 and 8) fixedly secured to a rock shaft 69 having its opposite ends supported in suitable bearings 69a carried by the front and rear frame members 25, 26. The crank 68 is provided with an elongated arm 68a having its free end forked and extending to and straddling the spindle 62 beneath the spindle-elevating disk 67. The forked portions of this arm support rollers 70 which seat against the under side of the spindle-elevating disk 67. The other and shorter arm 68b of the crank 68 supports a roller 71 which is adapted to engage the periphery of an operating cam 72 carried by the cam shaft 51, which cam is so shaped that in one complete revolution thereof the crank 68 is rocked to fully raise and lower the turntable. The lowering movement of the turntable is by gravity, the cam controlling the receding action at the desired rate of speed, and the stroke of the crank is such that it fully releases the turntable in its lowermost position to insure proper frictional engagement of the turntable with the drive.

In carrying out my invention, the need for a separate record magazine is eliminated, a complete stack of records, which will now be described, being normally supported directly upon the turntable.

*Record stack (Figs. 2, 7, 8, 16 and 17)*

The record stack includes a plurality of record-supporting trays of progressively increasing diameter, one for each record except the bottom record which is disposed directly upon the upper surface of the turntable. All of the trays are of similar form and but one will be described in detail. The tray takes the form of an annular metallic disk 80 (Figs. 2, 7, 8 and 16) having the peripheral edge thereof turned downwardly at an angle of approximately 60 degrees to form an annular flange 81 thereat. It is provided with a central depression 82 of sufficient diameter to readily receive the record to be supported thereby; and, in the center of this depression, there is provided an opening 83 through which the spindle section 62ª passes. The depression 82 is of slightly less depth than the thickness of the record so that, when a plurality of trays are assembled with their respective records, the immediately adjacent trays do not contact each other.

The side and bottom edges of the metal surfaces constituting the tray well 82, on both sides of the tray, are covered with a felt or other suitable material 84, providing a frictional surface engagement between the record and the tray which will tend to prevent relative movement between the tray and the record without tendency to mar the latter. With his arrangement, each record is definitely centered upon its respective carrier so that a plurality of carriers and records may be assembled together as a unit and readily applied to the turntable by merely passing the same over the spindle 62ª. In other words, the openings through the several trays and records are more or less self-aligned by this arrangement, including the peripheral flanges at the edges of the trays, so that the openings are all in substantially axial alignment. Any disalignment will be so slight that the mere starting of the spindle through the stack will enable the spindle to pass through and exactly align all records and trays.

While the foregoing is the preferable way of forming the trays, I may use, instead, the annular rib arrangement disclosed in Fig. 17, wherein, instead of the well 82, I strike upwardly from each tray an annular rib 85 forming a record-centering ring which has an inside diameter substantially the same as the diameter of the well 82. In that case, the records are disposed within the ring 85 and are thereby confined against lateral displacement with respect to the particular supporting tray so that a plurality of trays and records may be assembled as above stated. In some instances, the height of the ring forming the rib or bead 85 may be greater than the depth of the record so that the rib of one tray nests with the rib or bead on the immediately adjacent tray to more positively position or centralize adjacent trays with respect to each other in addition to the record-centralizing feature afforded by such rib. However, I, preferably, employ the ring 85 in such a way that the record projects above the top thereof—particularly since the peripheral tray flanges 81 afford a fairly accurate centering means for the trays.

The shape of the record and tray stack forms an important part of my invention, in that by shaping the stack in the manner that I am about to describe, I am able to eliminate a great number of operating parts heretofore necessary and thereby not only simplify the machine but also provide a machine which may be manufactured and sold at a much reduced cost. Such an arrangement also lends itself to a cooperation of parts which performs their functions in a highly efficient and substantially foolproof manner with a minimum of attention and maintenance.

More particularly, the record trays, while all are of similar shape, vary in diameter, the lowermost tray being of least diameter and the uppermost tray being of greatest diameter, the intermediate trays progressively increasing in diameter from the lowermost one to the uppermost one. This provides a stack of frusto-conical shape by which the results above referred to may well be carried out in conjunction with the mechanisms which I will describe hereinafter. By constructing and arranging the trays in the manner stated, the peripheral flanges 81 of the successive trays are not only spaced apart from each other vertically so that they can be readily engaged by an object disposed in their vertical path, but they are so arranged that any tray-engaging object will engage any particular tray only when it is disposed in the particular vertical path of movement of the peripheral edge of that tray. In other words, the record stack and trays have utility particularly in connection with the record-splitting mechanism which I will now describe.

The number of trays is one less than the number of records in the stack; and in the structure illustrated the stack includes sixteen records and fifteen trays, the number 1 record being at the top of the stack and the number 16 record at the bottom on the turntable.

*Record-splitting mechanism (Figs. 1, 3, 4, 7, 11 and 12)*

The record-splitting operation is accomplished by lowering the turntable in operative relation to selectively controlled stack-splitting members. The stack-splitting members take the form of a pair of diametrically opposed and vertically extending arms 90, 91 (Figs. 1, 3, 4, 7, 11 and 12). These arms are, generally speaking, of similar construction, and each is provided at its upper end with a horizontal head portion 92 (Figs. 1, 3 and 7) upon which is mounted a tray-engaging block 93 having inwardly extending, laterally spaced arms 93ª in the upper, inward faces of which are arcuate notches 94 which receive the free edges of the tray flanges 81. The blocks 93 are secured to the arms by a slot-and-stud connection 95 (Fig. 1—pair of spaced slots) permitting the blocks 93 to be adjusted inwardly and outwardly so as to exactly engage the tray flanges 81 when they are disposed in the vertical paths of such flanges.

The arm 90 (Fig. 11) is provided with a horizontal base portion 96, from the outer end of which depends a short bearing lug 97 and from the inner end of which depends an elongated leg 98. The bearing lug 97 and the leg 98 are provided with aligned openings in which are received the opposite ends of a supporting slide rod 99 fixedly secured in a hub 100 carried by the front frame member 25. The frame member 25 is also provided with a hub 101 supporting a lower slide rod 102 which is received in a slot 103 in the lower end of the arm 98, preventing rotation of the arm 90 and confining its movements to a horizontal, inward and outward slide movement.

The depending arm 98 (Figs. 11 and 12) is provided intermediate its slide bearings with a lateral projection 104 which supports an L-shaped bracket 105 shaped to provide with the lug 104 and arm 98 a recess 106 (Figs. 1, 4 and 7) which serves to connect the leg 98 of the arm 90 with its operating cam means, which will be described hereinafter. The leg 98 is further provided with a bottom, laterally extending lug 107 which serves as a stop element for engaging a part of the selecting mechanism to thereby determine the extent of inward movement of the arm 90, in a manner which will be referred to more particularly hereinafter. The leg 98 is further provided with a lug 108 to which is secured a horizontally disposed rack member 109.

The arm 91 (Figs. 3 and 7) is substantially of the same construction as the arm 90, including an elongated base portion 110 having a depending lug 111 and a depending leg 112, similar to lug 97 and leg 98 of the arm 90. The lower end of the leg 112 is slotted for slide engagement with the shaft 113, preventing rotation of the arm 91 similarly to the arm 90. The leg 112 of the arm 91 is also provided with a lug 114 similar to the lug 108 on the arm 90, supporting a rack bar 115.

The arms 90 and 91 are connected together for simultaneous movement to similar extents by the rack bars 109 and 115, which have their free end portions engaging a gear 117 (Figs. 1, 7 and 11) rotatably carried by the cross frame member 32. More specifically, the cross frame member 32, at its central portion is provided with an integral depending yoke 118 which, in turn, has a depending tubular hub part 119 upon which the gear 117 is rotatably mounted. The gear 117 is confined between a shoulder 120 formed on the tubular hub portion 119 and a collar 121 fixedly secured to the lower end of hub 119. In this way, the gear is confined for rotation without axial displacement.

The arms 90 and 91 are constantly urged toward each other by a spring 122 which is connected at one end at 123 to the depending leg 98 of the arm 90 and is connected at its opposite end to the cross frame piece 32 as at 124. The spring 122 is constantly under tension, tending to pull the arm 90 toward the axis of the machine and, since these two arms are connected together for simultaneous movement by the rack and gear structure described, it likewise tends to urge the arm 91 inwardly and simultaneously to similar extent.

The spreading-apart movement of the arms is accomplished by the following cam-actuated structure: A bifurcated bracket 125, carried by the front frame member 25, rotatably supports a vertically disposed rock shaft 126. One end of an arm 127 is rigidly, but adjustably, secured to this rock shaft and the other end of this arm projects toward the depending leg 98 of the arm 90 and is provided with a roller 128 which is received in the pocket or recess 106 provided by the bracket 105, hereinabove referred to. In this way, arm 127 is positively connected with the arm 90, so that movement of the arm 127 in opposite directions will transmit movement to and permit movement of the arm 90 and, in turn, the arm 91 (through the rack and gear mechanism). Another arm 129 having a cam roller 130 at its outer end is likewise rigidly, but adjustably, secured at its inner end to the rock shaft 126, so that the two arms 127 and 129 provide, in effect, an adjustable crank arm. The roller 130 of the arm 129 is engaged with the periphery of a cam 131 carried by the cam shaft 51. The cam 131 is so shaped that, during the cycle of operation, it rocks the arm 129 and, in turn, the arm 127 to move the arms 90 and 91 inwardly and outwardly under the control of the spring 122 and the rack and pinion structure.

In the operation of the machine, the arms 90 and 91 are moved inwardly, under the control of the foregoing mechanism, to variable extents to pick up and engage the peripheral flanges of any one of the record-supporting trays 80. It will be seen that, by raising the turntable 60 with the record trays thereon to a height wherein the lowermost tray is disposed above the tray-engaging blocks 93 of the arms 90, 91, then moving the arms inwardly into the path of the flange 81 of any particular tray, and then lowering the turntable, the particular tray with which the arms are aligned will engage the tray-engaging blocks on the arms and will remain stationary (with the record trays supported thereupon) as the turntable moves on to its lower and record-playing position. In this way, the stack of records and trays is split and the record uppermost on that part of the stack supported by the turntable is the particular record in playing position, and which will be played. Of course, if the uppermost record is to be played, the arms do not move in far enough to engage any of the record trays and, if the lowermost record is to be played, the arms move in sufficiently to pick up the lowermost tray.

The extent of movement of the arms 90 and 91 is controlled by selector mechanism key-controlled by the user, which mechanism will now be described.

*Selector mechanism (Figs. 2, 4–7, 9 and 10)*

The selector mechanism includes a selector shaft 140 (Figs. 4 and 7) rotatably supported by bearings 141 carried by the frame members 25 and 26, the shaft being of sufficient length that its opposite ends project through and beyond the respective bearings. The selector shaft 140, near its forward end, rigidly supports a drum member 142 having a helically disposed row of pins 143 thereon and extending therearound from end to end. The number of pins 143 corresponds to the number of records, the pin nearest the front of the machine being the number 1 pin with the others numbered consecutively. These pins are spaced apart longitudinally of the drum member 142 a distance equal to one half the difference in diameters of adjacent trays 80 in the stack; and each such pin serves as a stop element for limiting the movement of the arms 90 and 91 of the stack-splitting mechanism inwardly. In this way the pins 143 stop the arms 90 and 91 in position to engage the peripheral flange 81 of the record tray 80 which is disposed immediately above the tray carrying a record bearing the number of the particular pin engaged, excepting, however, the first or number 1 pin, which pin represents the playing of record number 1, or the record resting on the topmost tray, which pin is adapted to stop the movement of the arms 90 and 91 at such a position that they will not engage any tray.

The pins 143, in order to accomplish the foregoing result, cooperate with the above-described bottom lug 107 on the depending leg 98 of the arm 90. The lug 107 extends laterally toward the pins 143 and is long enough to engage any one of the pins 143 which may have been rotated into its path of movement by rotation of the selector shaft 140 and drum 142. That is, when the arms 90 and 91 are permitted by their operating cam 131 to move inwardly under the action of the spring 122, such movement will cause the lug 107 to strike the particular pin 143 disposed in the path of such lug, thereby stopping the stack-splitting arms in position for exposing a selected record (one bearing the number of the pin engaged) for playing.

The pins 143 are spaced apart circumferentially equal distances, the particular spacing being determined by the number of records contained in the stack. Since the stack contains sixteen records R, the pins are spaced circumferentially a one-sixteenth part of the circumference of the drum 142. By the foregoing spacing arrangement, rotation of the selector shaft 140 and the drum 142 one sixteenth of a revolution will move a different stop pin 143 into the path of the stack-splitting stop 107 so that, if the selector shaft and drum 142 are rotated, under the control of the selector mechanism, one or any number of sixteenths of a revolution, a particular record will be moved to playing position. Also, with this arrangement, if no selection is made by the user and the machine is operated continuously, the selector shaft 140 and drum 142 will be rotated fifteen-sixteenths of a revolution during each cycle of operation, thereby playing the records in the stack successively; but, if the shaft 140 and drum 142 are prevented from making fifteen sixteenths of a revolution by the actuation of a key or keys to be later described, the progressive sequence play is changed to selected play in accordance with the desires of the user.

The selector shaft 140 is rotated to accomplish the foregoing results by cam-actuated mechanism. More particularly, a pinion gear 144 (Figs. 4–7) is rotatably mounted upon the rear end of the selector shaft 140 and its teeth are operatively connected with the teeth of a sector gear 145 rotatably carried by the rear frame member 26. The sector gear 145 is provided with a sufficient number of teeth and the gear 144 is of sufficient size that each stroke of the sector gear will rotate the gear 144 to an extent sufficient to rotate the selector shaft fifteen sixteenths of a revolution. The gear 144 is drive-connected to the selector shaft 140 by means of a drum 146 (Figs. 4 and 7) fixedly secured to the outer end of the shaft 140 and having a friction surface 146ª in the form of a lining formed of felt or other suitable material. The gear 144 is provided with a fixed L-shaped arm 147, the L-leg of which overhangs the drum 146 and is fixedly connected to one end of a spring shoe 148 which is adapted to ride upon the drum friction surface 146ª. The shoe 148 is held normally in slight tensioned frictional engagement with the friction surface by a spring 149 connected at one end to the gear arm 147 and at the otherwise free end to the spring shoe. This arrangement is such that when the gear 144 and its arm 147 are rotated in clockwise direction (as viewed in Fig. 5) by the sector gear 145, the spring shoe is pressed into sufficient frictional engagement with the drum surface 146ª to rotate the drum 146 and shaft 140 in clockwise direction so long as shaft 140 is permitted to rotate by the selector mechanism. In other words, as will be described more fully hereinafter, in selection play, stop means are set for stopping the rotation of the shaft 140 after predetermined rotation has taken place, correspondingly to a certain record selection; and, if no such selected stop means is effective to stop rotation of the shaft 140, the mechanism just described will rotate such shaft fifteen sixteenths of a revolution. However, if a stop means becomes effective, before the sector gear 145 has made its full shaft-rotating stroke, this structure permits the sector gear 145 and gear 144 to continue to rotate a full stroke extent, the spring shoe 148 slipping upon the drum surface 146ª to permit this movement without moving the shaft 140. When the sector gear 145 and gear 144 are rotated in a counterclockwise direction, the backward movement of the spring shoe 148 effects a yielding movement of the coil spring 149, loosening the shoe upon the drum and permitting the shoe to slip easily relatively to the drum without effecting any rotational movement of the shaft 140.

I positively guard against any possible movement of the selector shaft 140 in the counterclockwise movement of the gear 144, by providing a shaft lock operative after a selected shaft movement has been effected. This lock takes the form of a star wheel 150 (Figs. 1, 4, 6, 7, 9 and 10) having sixteen notches corresponding to the number of records in the stack and the number of pins 143 on the drum 142. This star wheel is adapted to be engaged by a dog 151 (Figs. 9 and 10) carried by a crank arm 152 pivotally supported on the rear frame member 26 at 153. The end of the crank 152 opposite the dog 151 is provided with a roller 154 adapted to engage the periphery of a cam 155 carried by the cam shaft 51. The cam 155 is so arranged that the dog 151 is disengaged thereby just prior to the time that the rotation of the selector shaft is started and the cam releases the crank arm for reengagement of the dog under the influence of a spring 156 acting on crank 152 immediately after the sector gear 145 has made its complete shaft-rotating stroke. In this way, further operation of the sector gear and any of the other parts of the machine will not in any way affect or change the position of the selector shaft until a new cycle of operation takes place.

The sector gear 145, except for a very short part of each cycle of operation, assumes the position shown in Fig. 6. Its movement is accomplished from the cam shaft 51 by means of a crank arm 157 (Figs. 4, 5 and 6) pivotally supported by the rear frame member 26 at 158. The forward or longer arm of the crank 157 is pivotally connected to one end of a link 159, the other end of which is pivotally connected to the sector gear 145 as at 160. The other and shorter arm of the crank 157 supports a roller 161 which is adapted to be engaged by the periphery of a cam 162 mounted upon the cam shaft 51. The crank 157 is constantly urged in a direction to yieldably hold the sector gear in the position of Fig. 6 by a spring 163 connected to the forward end of the longer arm of the crank and to the rear frame piece 26, and by another spring 164 connected at one end to the shorter arm of the crank 157 and at its other end to a frame-carried bracket member 165, which will be mentioned more specifically hereinafter in connection with the tone arm control mechanism. With the foregoing arrangement, the longer arm of the crank 157 and the link 159 constitute, in effect, a toggle which, when it is closed by the cam 162 in opposition to the springs 163 and 164, rotates the sector gear 145 in a counterclockwise direction (as viewed in Figs. 5 and 6), thereby rotating the gear 144 fifteen sixteenths of one revolution during each cycle of operation of the machine. As the gear 144 is rotated, the selector shaft 140 will be rotated until it is stopped by key-actuated stop means constituting part of the selector mechanism, and which will be referred to more in detail hereinafter. When the selector shaft 140 is stopped and the crank 157 is released by the cam 162 for spring operation, the toggle formed by the crank 157 and arm 159 is opened, moving the sector gear 145 clockwise to its original normal condition ready for another operation in the next cycle of movement of the mechanism. A frame-carried stop 159ª is adapted to be engaged by the crank arm 157 at the end of the toggle opening movement, thereby stopping and holding the sector gear and its operating mechanism in their predetermined normal positions. The stop 159a is adjustable to insure the rotation of the selector shaft 140 substantially fifteen sixteenths of a revolution when that extent of movement is permitted.

Rotation of the selector shaft is stopped according to a record selected for play by the following mechanism: A selector frame 170 (Figs. 1-4) is fixedly mounted upon the upper, outer portion of the front frame member 25. This frame member supports a pair of forwardly extending arms 171 in the outer ends of which is rotatably mounted a so-called stop shaft 172. This shaft 172 has reduced bearing end portions 172a for rotatably mounting the same in the arms 171, and these reduced portions 172a are of sufficient length to permit the shaft to have longitudinal shift movement. The shaft 172 is directly drive-connected with the selector shaft 140 by a train of gears including a gear 173 (Fig. 4) fixedly secured to the shaft 172 and a gear 174 fixedly mounted on a shaft 176 journaled in a U-shaped bracket 175 mounted on the frame-carried bracket 170. The gear 174 meshes with the gear 173 and the latter is of such width that it remains in mesh with the gear 174 during the longitudinal shift movement of the shaft 172. Shaft 176 also fixedly supports a helical gear 177 which meshes with a complemental helical gear 178 mounted on the forward end portion of the selector shaft 140. By this arrangement, the selector shaft 140 and stop shaft 172 are rotated in a 1:1 ratio, so that one revolution, or any part thereof, of the shaft 140 results in one revolution, or a similar part thereof, of the shaft 172.

The stop shaft 172 is provided with a plurality of pins 179 arranged in a helical row extending from one end of the shaft to the other. These pins correspond in number to the pins 143, and they are spaced apart circumferentially in a manner identical with the pins 143 on the selector shaft 140; wherefore, by causing any one of the pins 179 to strike a stop (which I will describe later), the selector shaft 140 is caused to rotate to a selected extent, thereby positioning a corresponding pin 143 on the selector shaft drum 142 in position to be engaged by the lower lug 107 on the leg 98 of the stack-splitting arm 99. In carrying forward this feature of my invention, I enable the user, through the actuation of a key, to throw a particular stop, representing a particular record, in position to be struck by a particular pin 179 for the playing of the particular, selected record.

More particularly, sixteen keys 180 (Figs. 1, 2, 3 and 7), one representing each of the sixteen records, are arranged side by side in equally spaced relation in a horizontal keyboard at the forward part of the machine. Each of the keys 180 is provided with the rearwardly extending shank 181 passing through and confined in a vertical slot 182 in a forward, upstanding flange 183 on the frame piece 170. The slot 182 is of slightly greater length than the width of the shank so that it will permit reciprocation of the shank within definite limits, the upper limit being the upper end of such slot. The rear ends of the shanks 181 are received in open-ended slots 184 formed in a rear upstanding flange 185 on the frame piece 170, and they are pivotally supported therein by a cross rod 186 which is confined in a groove extending longitudinally of the flange 185 by a plurality of spaced, detachable lugs 187. The keys 180 are normally and yieldingly retained in an upper, raised position by a plurality of spring members 188 (Figs. 2, 3 and 7), one for each key. These spring members 188 take the form of leaf springs having their lower ends detachably secured to the forward edge portion of a detachable guide bar 189 carried by the forward face portions of the frame member 170. The upper ends of the spring members 188 are V-shaped, the opposite V-sides of which form cam surfaces cooperating with a laterally carried pin 190 on the key shank 181 (Fig. 3). In the raised position of the keys, the pins 190 rest on the outermost V-face and in the depressed position of the keys it rests on the other side of the V-face surface, the key being retained in either of these positions by moving it past center, so to speak, which center is the apex of the V referred to.

Each key 180 is adapted to actuate a stop member which is the stop member hereinabove referred to as cooperating with the pins 179 on the shaft 172—for stopping the selector shaft 140 in a predetermined position representing a particular record indicated by the key depressed. More particularly, the inner edge of the guide bar 189 is provided with squared notches, one for each key 180 which, when the bar 189 is assembled upon the frame piece 170, form guide slots for stop members 191. Each stop member 191 (Fig. 2) takes the form of an elongated piece having its upper end pivotally supported at 191a upon the forward face of the frame piece 170. The upper end portion of the member 191 is a sector-shaped portion providing an upper straight surface 191b so disposed that it rests against the under side of the shank 181 of a key 180. The normal position of each stop member is that illustrated for keys Nos. 2 to 16 in Fig. 2, in which position the keys 180 are raised and the stop members are disposed between the stop pins 179 on shaft 172. Depression of a key, such as the number 1 key illustrated in Fig. 2, will swing the related stop member 191 laterally and in clockwise direction, and it will be held there by the key spring 188 above described. The stop member 191 is held normally in its counterclockwise position (Fig. 2) by a spring 192 having one end secured at 193 to the sector-shaped portion and at its other end secured to the frame piece 170.

The stop member piece 191 is of greater width than the stop pins 179 and, when a key 180 is depressed, the particular stop member associated therewith is moved clockwise (see number 1 key in Fig. 2) to an extent sufficient to align the lower end of the stop member 191 with a corresponding pin 179 on the shaft 172. When a key is depressed, the downward movement of a key 180 is limited by the length of the recess in which the stop member 191 moves; and, when a key is depressed, it is retained in that condition until it is released manually or by cancel mechanism automatically actuated from the cam shaft.

In the use of the foregoing structure, the selector shaft 140 is positively actuated through the sector gear 145, and the extent of rotation of the selector shaft 140 is determined by depressing a particular key 180 to throw a particular stop member 191 into position to be engaged by a particular stop pin 179. Since the shafts 140 and 172 are directly connected, when a pin 179 strikes a stop member 191 it not only stops the shaft 172 but the shaft 140, the sector gear mechanism continuing in its overrun and return operation as hereinabove described, leaving the shafts 172 and 140 in their selected or rotated condition. As this action takes place, the pin 143 on the selector drum 142 corresponding to the record selected for play is positioned to be engaged by the lug 107 on the stack-splitting arm 90 thereby positioning a selected record for play as explained in connection with the stack-splitting operation.

If the user should select a combination of several records to be played, a plurality of keys 180 (corresponding to the selected records) are depressed, setting a plurality of stop members 191 to engage a plurality of complemental pins. In order that all records of the selected combination may be played, I provide automatic cancel mechanism for restoring the key representing the record being played to its normal position so that, during the next cycle of operation the selector mechanism may function for play of the next selected record. This automatic cancel mechanism takes the form of a rock shaft 195 (Figs. 1, 2 and 4) rockably supported in a bearing 196 secured to the front frame piece 25. This rock shaft is mounted slightly above the stop shaft 172 and it is provided with a right-angled, downwardly turned end portion 195ª which is aligned with the adjacent end of the stop shaft 172. Upon the inner end of the rock shaft 195 is fixedly mounted a rocker arm 197 having a roller 198 at its outer end which is adapted to engage the periphery of a cam 199 mounted upon the cam shaft 51. The stop shaft 172 is normally urged toward and against the depending end 195ª of the rock shaft 195 by a leaf spring 200 (Figs. 1 and 4) secured at one end to the frame piece 170 and having its outer end slotted to straddle the adjacent end of the shaft 172. This outer end of the spring 200 bears against a sprocket gear 201 forming a part of a record indicator which will be described more fully hereinafter. The spring 200 tends constantly to move the shaft 172 to the right as viewed in Fig. 4, but the cam 199 is so shaped and it is so positioned upon the cam shaft 51 that, during the greater portion of a cycle of operation, it holds the shaft 172 in its left-hand position of Fig. 4 against the action of the spring 200. It is in this position that rotation of the shaft 172 will position its pin 179 to operatively engage the complemental stop members 191. However, as the cam shaft 51 is rotated during a cycle, and at a time immediately following the operation of the star wheel 150 and dog 151 to lock the selector shaft 140 in a selected position, the rocker arm 197 is released by its cam 199, permitting the spring 200 to momentarily shift the shaft 172 to the right as viewed in Fig. 4. As this action takes place, a particular pin 179 is engaged with a particular stop member 191, and I so construct the stop member 191 that the foregoing movement returns the same to its non-pin-engaging position. More particularly, the lower end portion of the stop member 191 that engages the pin 179 is provided with an outwardly turned, right-angular lug 191ᶜ which laterally engages the stop-engaged pin 179 so that, as the shaft and that pin are shifted to the right as described, the stop member, through the lug 191ᶜ will be shifted back to its non-pin-engaging position, in turn raising the particular key through the engagement between the fan-like portion 191ᵇ and the key shank 181, as above described.

If, after a combination of selections has been made, the user desires to change that combination and reset the keys 180 to form a new combination, I provide a manual cancel mechanism permitting that to be done. Specifically, at the middle of a row of keys 180 I mount a cancel key 202 (Figs. 1 and 2) having a shank 203 pivotally supported by the forward flange of frame piece 170, which key is constantly urged upwardly into the normal plane of the other keys 180 by a spring 204 secured at one end to the key shank 203 and its other end to the top of the key-supporting flange. The inner end of the cancel key shank 203 supports a cancel bar 205 which extends laterally beneath the shanks 181 of all keys 180 so that, when the cancel key 202 is depressed, it will raise the bar 205 thereby striking the under edges of the key shanks 181 and raising all keys to the normal, horizontal, nonselecting position.

I have found that the user, as well as other persons listening to the playing of a record, may desire to check the machine to determine the particular record being played. To that end, I provide indicator mechanism controlled by the selector mechanism which is automatically set to indicate the particular record being played. This mechanism takes the form of a drum 210 (Figs. 1, 2 and 4) rotatably supported upon a stub shaft 211 carried by an arm 212 on the front end portion of the frame piece 170. The inner face of the drum 210 supports a sprocket 213 which is connected by a chain 214 with the sprocket 201 mounted on the end of the stop shaft 172. The outer, peripheral surface of the drum 210 is provided with a graduated scale 210ª including sixteen numbers equally spaced apart in a manner complemental to the circumferential spacing of the pins 179 on the stop shaft 172 and the pins 143 on the selector shaft drum 142. The cabinet structure C enclosing the machine includes a front wall part 215 having therein a narrow peep slot 216 so located relative to the drum that rotation of the stop and selector shafts 172 and 140 moves the drum to an extent sufficient to expose the number of the particular record selected and being played through such slot.

The recording on any particular record is reproduced by reproducer mechanism including a so-called tone pickup head 220 of any desired form suitable for electrical reproducing operation. This pickup head supports the usual reproducing needle 221 which is adapted to engage the grooves of a record. The pickup head 220 is supported by a tone arm structure 222 of such form and so mounted that the pickup head 220 may be raised and lowered and may be swung inwardly and outwardly. The pickup head 220 is associated with suitable sound-transmitting and amplifying mechanisms which may take any well-known form and need not be shown and described herein.

*Tone arm and tone arm control mechanism (Figs. 1 and 3–6)*

The tone arm structure 222 (Fig. 3), preferably, takes the form of a pair of similarly shaped, parallel arms 223, each pivotally connected at its forward end to the pickup head 220 and pivotally connected at its rear end between a pair of upstanding ears 224 carried by a mounting plate 225. The pivotal connections 226 for the forward ends of the arms 223 are so arranged that the pivots 226 are disposed in the same vertical plane. This is also true of the rear end pivots 227, whereby the tone arm structure 222 may be swung vertically between rather wide limits and the pickup head 220, during such movement, is maintained in a substantially horizontal position. The advantage of this lies in the fact that the reproducing needle 221 engages the records at different elevations in playing, dependent upon the particular record selected, and it is necessary for proper and substantially uniform reproduction that such needle engage all records in substantially the same manner, notwithstanding such difference in height at which the record is engaged. Also, with this arrangement, the distance from the rear mounting pivots and the point of engagement with the record, notwithstanding the particular height of the record engaged, is maintained substantially uniform so as to keep the needle 221 as nearly as possible in the same parallel relation with the record grooves when playing at all different record heights.

The tone arm mounting plate 225 (Fig. 3) is nonrotatably secured to a plate 228 on the upper end of a vertically disposed tone arm shaft 230 by bolts and nuts 229. The connection between the plates 225 and 228 includes rubber mounting blocks 231 and 232 for insulating the tone arm structure, as far as possible, from the tone arm control and operating mechanism, thereby preventing possible so-called feed-back in the reproduction of the record. This mounting accomplishes this result by substantially eliminating the transmission of vibrations from the tone arm operating mechanism to the pickup head 220.

The tone arm shaft 230 (Fig. 3) is rotatably supported by a bracket 233 having a pair of spaced arms 234 secured to the rear frame member 26. The bracket 233 is provided with a pair of vertically spaced and aligned bearings 235, 236, in which the shaft 230 is rotatably mounted, and such shaft is supported against vertical movement in either direction by a hub 228$^a$ on the plate 228 seating upon the top of the bracket bearing 235 and by a collar 238 which is confined between a shaft-operating arm 239 and the bottom of the lower bracket bearing 236. In this manner, the shaft 230 is rotatable to swing the tone arm structure 222 inwardly and outwardly to such an extent that such structure may be disposed outwardly and laterally of the stack of records and also inwardly adjacent the axis of the turntable support. This inward and outward swinging movement is accomplished through the arm 239 and a cam 240 (Figs. 1, 3 and 4) mounted upon the cam shaft 51. The arm 239 and its roller 241 are constantly urged toward the cam 240 by a spring 242 mounted upon the outer end of the cam shaft 51 between the hub 240$^a$ of the cam 240 and a shoe 243 slidably mounted upon the cam shaft. The arm 239, at its end adjacent the shaft 230, is provided with a right-angled bracket 244 (Fig. 4), the free leg of which extends at substantially right angles toward and between the flanges 243$^a$ of the shoe member 243. In the outer, inactive position of the tone arm, as indicated in full lines in Fig. 4, the bracket 244 engages the inner shoe flange 243$^a$ and moves the shoe 243 to the left as viewed in Fig. 4, placing the spring 242 under tension. This movement of the arm 239 is effected by the cam 240 which is so shaped and located that, at that particular point in the cycle of operation where it is desired to move the tone arm inwardly to engage the needle 221 with the first groove of the record, the arm 239 is moved by the spring 242 in a clockwise direction (as viewed in Fig. 4), in turn moving the tone arm structure 222 toward the first groove of the record. The spring-actuated movement of the shoe 243 is limited by an adjustable screw stop member 245 adjustably secured in the hub 246$^a$ of a tone arm lifting cam 246 carried by the outer end of the cam shaft 51. As soon as the shoe 243 strikes the pin 245, the tone arm shaft is no longer urged in clockwise direction and the cam 240 is so shaped that it is effective at this time to hold the arm 239 in a position to engage the first groove of the record, such position being retained until the tone arm is actually lowered into playing engagement with the first groove of the record. As the tone arm is thusly held, the cam 240 continues to rotate to a position wherein the roller 241 on the arm 239 is completely disengaged from the periphery of the cam, freeing the tone arm shaft 230 for rotation under the influence of the grooves in the record. At this time also, it may be stated that, as this latter action takes place, the cam shaft is disconnected from the main drive so that no operation of the cam 240 takes place to disturb this relation until the playing of the record is complete.

As the tone arm shaft 230 moves clockwise under the influence of the record grooves, the bracket 244 carried by the arm 239 continues to move clockwise substantially to the dotted-line position of Fig. 4, where it is quite close to the outward flange 243$^a$ of the shoe 243, but out of engagement therewith. After the playing of the record has been completed and the cam shaft again connected with the drive, as will be explained hereinafter, continued rotation of the cam 240 will again pick up the roller 241 on arm 239, swing such arm counterclockwise, reengaging the bracket 244 with the inner flange 243$^a$ of the shoe 243, and again place the spring 242 under compression ready for the next cycle of operation. In this action, also, the counterclockwise movement of the arm 239 swings the tone arm structure counterclockwise to its outermost inactive position (full lines Fig. 4) beyond the flange of the largest tray 80.

Raising and lowering of the tone arm is accomplished by the following structure: The under side of the lower tone arm member 223 is provided with a Z-shaped bracket 250 (Fig. 3), the lower leg of which extends substantially parallel with the arm 223 in spaced relation thereto. This bracket is adapted to be engaged by a pin 251 carried by the upper leg 252$^a$ of a U-shaped bracket 252, the upper and lower legs 252$^a$ and 252$^b$ of which are slidably mounted upon the tone arm shaft 230. For structural convenience, the upper arm 252$^a$ of the bracket 252 extends through a slot 233$^a$ formed in the bracket 233, which slot is of sufficient length to permit full up-and-down movement of the bracket 252 as well as swinging movement of such bracket as may take place when the tone arm is moved inwardly and outwardly. The bracket 252 is prevented from rotating relative to the tone arm shaft 230 by a collar 253 secured to the shaft 230 and having a pin 254 projecting therefrom and engaging an elongated slot 255 in the U-base portion of the bracket 252. The collar 253 also serves to determine the lower limiting movement of the bracket 252 relative to the shaft 230. The upward limit of movement of the bracket 252 is determined by an arm 256 carried by the U-base of the bracket 252 and has an opening through which the shaft 230 passes. The arm 256 is located at such a point that it strikes a collar 257 located beneath the collar 253.

When the bracket 252 is raised, the pin 251 thereof engages the tone arm bracket 250 and raises the tone arm structure 222 and, vice versa, when the bracket 252 is lowered. The lowering movement afforded by the bracket 252 is such as to drop the tone arm below the lowermost record of the stack, thereby insuring that the tone arm will be fully engaged with the grooves of the record. The tone arm structure is balanced in its record-engaging positon by a coil spring 222ª between the upper and lower arms 223. The spring 222ª is secured at one end, as at 223ª, to the lower arm 223 and at its other end, as at 223ᵇ, to the upper arm 223. This latter spring connection includes a lug 223ᵇ carried by the upper arm 223 and having an opening through which passes the stem of an eyebolt 223ᶜ having its head portion secured to the spring 222ª. The stem of the eyebolt 223ᶜ is threaded and adjustably receives a thumb screw 223ᵈ for securing the end of the spring in place and for adjusting the tension of the spring 222ª to, in turn, adjust the weight under which the tone arm needle 221 engages the record.

The raising and lowering of the bracket 252 is accomplished by the cam 246 on the cam shaft 51. Specifically, a shaft 258 (Figs. 3-6) rigidly carried by the rear frame member 26 rotatably supports the hub 259ª of an arm 259 which supports intermediate its ends a roller 260 adapted to engage the periphery of the cam 246. The free end of the arm 259 extends to the tone arm shaft 230 and is bifurcated to straddle the same and to engage beneath the bracket arm 256 (Fig. 3). The cam 246 is so shaped that it cooperates with the roller 260 to raise the arm 259 and, in turn, raise and hold raised the bracket 252 and tone arm structure 222. The cam surface is also so shaped that in one rotary position thereof it permits the bracket 252 and tone arm 222 to drop to an extent sufficient to engage the needle 221 with the record groove. This portion of the cam is so positioned that this action takes place immediately following the end of the swinging movement of the tone arm toward its initial record groove-engaging position.

During the time that the record is being played, the cam shaft 51 is stationary, clutch mechanism having previously been operated to disconnect the main drive from the cam shaft. At the end of play of a record, the tone arm operates mechanism to reengage the cam shaft with the main drive and thereby cause lifting of the tone arm from the record and the return swing movement of the same to its position outside the record stack. This clutch mechanism will now be described.

*Clutch mechanism (Figs. 1, 3, 4 and 20)*

The clutch mechanism for connecting the cam shaft with the main drive takes the form of a flange 270 (Figs. 3 and 4) on the hub of the cam shaft gear 50, the periphery of which flange is provided with a plurality of equi-spaced, square teeth providing a plurality of peripheral, square notches 271. The notches 271 are adapted to receive the squared end 272ª of a dog 272 pivotally supported at 273 by one end of an elongated block member 274 which is fixedly secured at its other end to the cam shaft 51. The dog 272 is constantly urged toward engagement with the flange notches 271 by a leaf spring 275, and so long as the outer end 272ᵇ of the dog 272 is free, such dog is drive-engaged with the flange 270 so that the drive shaft 62 drives the cam shaft 51 through the gear 49, pinion 46 and gear 50. However, at a point immediately following the lowering of the reproducer in playing engagement with the record, the outer end 272ᵇ of the dog 272 strikes the upper cam-like edge 276 of a trip element 277 (Figs. 3, 19 and 20) supported by a right-angled arm 278 having one arm thereof pivotally mounted on a rod 279 carried by a pair of arms 280 secured to the rear frame member 26. When the cam element 276 is struck by the dog end 272ᵇ (needle 221 fully engaged with the initial record groove), the dog is rocked toward the cam shaft 51 thereby lifting its outer, squared end out of engagement with the notches 271 in the hub 270, thereby disengaging the cam shaft from the main drive so that the former remains stationary while the main drive shaft continued to rotate.

The latter condition exists until the record has finished playing and the tone arm needle 221 has moved into the so-called terminal groove of the record, at which time the tone arm shaft 230 actuates mechanism for releasing the cam element 276 from the dog 272, permitting the spring dog 275 to reengage the dog with the gear 50. Such mechanism includes an arm 281 fixedly secured to the lower end of the tone arm shaft 230 and supporting at its outer end a roller 282, as well as a depending, swinging dog 283. The pivoted clutch-operating arm 278 is constantly urged in a counterclockwise direction (as viewed in Fig. 3) by a spring 284 connected at one end to the horizontal arm 278ª and at its other end with the frame-carried bracket 280. The outer, free end of the horizontal arm 278ª is extended reversely along the rear frame member 26 and such arm, and particularly the outer end portion thereof, is slightly curved upwardly as at 287, thereby providing a camway. This camway is of arcuate shape and is disposed in the path of arcuate travel of the roller 282 on the arm 281. As the tone arm is moved inwardly by the record grooves, the roller 281 approaches the upwardly sloping cam surface 287 and, by the time that the needle 221 is moved into the terminal groove of the record, such cam surface is engaged and depressed, thereby rocking the arm 278 and trip element 277 in a clockwise direction (as viewed in Fig. 3), thereby freeing such element from the dog 272 and permitting the dog to reengage the gear 50 as above set forth. When the parts are thus reengaged and the cam shaft is rotated, the cam mechanism hereinabove described is effective to both raise the tone arm 222 and return it outside the range of movement of the record trays.

It is found desirable, in some instances, to positively prevent the possibility of a person slightly lifting the tone arm from the record and returning it to the initial playing groove for replaying the record before the cam shaft is cut in as above explained—particularly where the machine is operated by coin-controlled mechanism. To that end, the upper surface of the reversely turned end of the arm 278ª is provided with a plurality of teeth 287ª which slope in the direction of the cam end of such arm and which are adapted to cooperate with the swinging dog 283 in such a way that, when the tone arm is moved in clockwise direction (as viewed in Fig. 4) by the playing record, the dog 283 will slide over such teeth without influencing the position of the lever 278; but, upon any tendency to return the tone arm shaft and reproducer mechanism any substantial distance toward the initial playing position, the dog 283 will engage the teeth 287ª causing the arm 278 to be depressed and the clutch to be reengaged with the gear 50, again cutting in the cam shaft and starting a new cycle of operation. I have found that my purpose will be well served by providing a toothed surface 287ª of such length and so spaced from the camway 287 that the tone arm may be swung from the innermost record groove toward the initial record groove to an extent equal to approximately one half the playing surface of the record without actuating the arm 278 so that, if an attempt is made to replay the record, only the last half portion thereof may be replayed without starting a new cycle of operations.

*Motor switch-operating mechanism (Figs. 3, 9, 10, 19 and 20)*

The operation of the motor 40 is controlled by a switch (not shown) forming part of a so-called coin-controlled magazine switch unit 289 which may take any well-known form. For purposes of this description, it will be sufficient to merely say that the switch mechanism may be of the well-known ratchet type which is automatically set for one cycle of operation when a single coin, such as a nickel, is inserted therein; is automatically set for two cycles of operation when a coin, such as a dime or two nickels, is inserted therein; is automatically set for, say, five cycles of operation when a quarter or five nickels are inserted therein, and is automatically set for any desired number of cycles, without stopping of the drive mechanism, by inserting the desired number of coins, preferably not more than twenty nickels, therein. In mechanism of this type, the magazine structure is usually actuated for switch-opening movement by mechanism operated by a moving part of the machine; and to this end I provide structure actuated by the clutch structure above described.

Specifically, such actuating structure includes a crank 290 (Figs. 9 and 10) which, upon reciprocation, actuates the magazine switch 289 to open the motor switch thereof, the number of actuations of such lever required for actually opening the switch depending upon the number of cycles initiated by the insertion of coins. The crank 290 is actuated by the clutch block 274 as follows: One arm of the crank is pivotally connected to the forward end of a link 291, the rear end of which is pivotally connected to an arm 292 rotatably mounted upon the cross frame brace member 30. The crank 290 is constantly urged in a clockwise direction by a spring 290ª connected at one end to the other crank arm and at its other end to the outer casing of the magazine switch 289. The cam block 274 is provided with a depending arm 293 disposed in the path of and adjustable on the clutch block for proper engagement with a pin 294 on the link 291. The pin 294 on the lever 291 is so located relative to the clutch block arm 293 that the pin will be engaged to actuate the link 291 forwardly to, in turn, preliminarily actuate the crank 290 toward switch-opening position at the time the clutch is actuated by the clutch-opening mechanism to disconnect the cam shaft 51 from the main drive. The clutch block arm 293 remains in engagement with the link pin 294 while the clutch is disengaged, but without actuating the magazine switch mechanism 289 to open the motor switch. However, as soon as playing of the record is finished and the clutch is again engaged and the cam shaft 51 rotated, the clutch block and its arm 293 rotate and further reciprocate the link 291 forwardly to its motor switch opening position. This action results in opening the motor switch as soon as possible after the playing of the last record to be played of any group selected and paid for. In this way, the switch is actuated to stop the machine at the end of a cycle so that there will be enough of the cycle remaining to be carried out before the tone arm is again lowered into playing position to permit a transmitting mechanism or parts thereof, such as tubes, to properly heat up for proper reproduction before the playing starts. If desired, the switch crank 290 may be actuated directly from the crank shaft through the link 291 without departing from my invention.

To prevent any possible kick-back action of the cam shaft 51 during the operation of the foregoing mechanism at the time the clutch mechanism is released, I employ a cam shaft lock. This lock includes a stop arm 295 rotatably mounted on shaft 195 (Figs. 1 and 4) of the automatic cancel mechanism with an end portion in engagement with the periphery of the cancel cam 199. This arm 295 is spring-pressed into engagement with the cam by a spring 296 secured at one end to the end of the arm 295 opposite its cam-engaged end and at its other end to the front frame member 25. With this arrangement, the arm 295 rides on the greater radius surface of the cam 199 until it drops into the recess 199ª (Figs. 19 and 20) provided in such cam for actuation of the cancel mechanism. The time that the end of arm 295 drops into the recess 199ª is that time when the cam shaft clutch has just been released, and the cam block 274 has actuated the link 291 through its preliminary stroke placing the switch crank arm spring 290ª under tension tending to urge the cam shaft 51 reversely through the clutch-and-link connection. When the arm is engaged in recess 199ª, any reverse or kick-back movement of the cam shaft is positively prevented.

*Counting mechanism (Figs. 1, 7 and 18)*

Machines of the foregoing character are particularly suited for use in public places, and it is highly desirable to know the particular musical selections that are most popular with the public, all to the end of furnishing each machine with the most popular records for the greatest amount of play. To that end, I provide automatic counting mechanism operative under the control of the selector shaft 140.

More particularly this counting mechanism includes a rectangularly shaped frame member 300 (Figs. 1, 7 and 18) carried by the rear frame piece 26. The ends of the bracket 300 rotatably support a shaft 301 upon which are rotatably mounted a plurality of wheels 302, one for, and representative of, each record in the stack. The periphery of each of these wheels is shaped to provide a friction surface adapted to cooperate with individually mounted brake shoes 303 carried by the frame piece 300.

Each of the wheels 302 is rotatably mounted upon the shaft 301, but they are individually, frictionally engaged with such shaft for rotation therewith except at such time when the respective brake shoe therefor is engaged with the drum peripheral surface thereof. The friction mounting for the wheels 302 includes a plurality of disks 304 fixedly mounted in spaced relation upon the shaft 301 and against each of which one of the faces of one of the wheels 302 is seated. Between each of the disks and the non-disk-engaging face of the adjacent wheel is disposed a coil spring 305 under tension which urges the disk-engaged face of each wheel 302 into a frictional engagement with one of the disks 304, the spring being of sufficient strength to cause the wheels to rotate with the shaft 301 except at the time above described. In order to reduce the friction between the wheels 302 and the disks 304 to merely that required for them to rotate together and to provide an arrangement wherein the brake shoe need only engage the periphery of the wheel with slight pressure, the friction-engaging portion of each disk 304 is reduced by an outer rim portion which is the only disk surface that frictionally engages the face of the wheel.

The structure described is so arranged that the brake shoes are constantly urged into frictional engagement with the respective wheels, thereby constantly tending to prevent all of the wheels from turning when the shaft 301 rotates. To this end, the brake shoes take the form of elongated pieces rockably supported by a depending yoke 307 carried by the frame piece 300. The upper and wheel-engaging ends 303$^a$ of the shoes 303 are urged into frictional engagement with the drum surfaces of the wheels by coil springs 306 (Figs. 7 and 18) secured to the lower ends 303$^b$ of the shoes and to the frame piece 300.

The brake shoes 303 are actuated to release the wheels 302 through the selector shaft 140 (Figs. 4 and 18). Specifically, I employ a shaft 308 having its opposite ends journaled in bracket members 309 carried by the rear frame member 26 beneath the frame piece 300. The shaft 308 is provided with a helical row of pins 310 (in this instance sixteen, corresponding to the number of records in the stack) spaced circumferentially relative to each other in accordance with the spacing of the pins 143 on the selector shaft drum 142 and the pins 179 on the stop shaft 172, and are also spaced longitudinally according to the spacing of the brake shoes 303. The pins 310 are so located that, as the shaft 308 rotates, they will strike the lower ends (Fig. 18) of the shoe members 303 and swing the same about their support to move their upper ends away from the wheels 302 to release the same. The end of the shaft 308 adjacent the selector shaft 140 supports a beveled gear 311 which engages a similar (1:1 ratio) gear 312 on the end of the right-angularly extending selector shaft 140. With this arrangement, when the selector shaft 140 is rotated in the manner hereinabove described to a certain extent for the playing of a particular record, the counter shaft 308 is rotated to a similar extent causing a corresponding pin 310 to engage its respective brake shoe member 303 and release it from its respective wheel, which is the wheel corresponding to the particularly selected record. When the structure is so released, the wheel-supporting shaft 301 is rotated together with a particular wheel 302 that may be released by its shoe 303. The drum surface on each wheel is provided with graduations 302$^a$ indicating a large number of operations for each complete rotation of the wheel, and the counter mechanism is so constructed that it is rotated only one graduation or one step during each movement of the shaft 301. In other words, the shaft 301 is rotated each time a record is played only one step or graduation of the drum on the wheel 302.

The shaft 301 is rotated step by step by the following mechanism: The left-hand end of the shaft 301 (Fig. 18) fixedly supports a ratchet wheel 313, the number of teeth therein corresponding to the number of graduations on the drum of each wheel 302. The ratchet wheel 313 is actuated by a pawl 314 pivotally supported by an arm 315 rockably carried upon the adjacent end of the shaft 301 outwardly of the ratchet wheel 313. The pawl 314 is urged into counterclockwise direction into engagement with the toothed ratchet wheel 313 by a spring 316 connected at one end to the arm 315 and at the other end to the tail of the pawl 314. The pawl nose is so shaped that, when the arm 315 and the pawl 314 move in a counterclockwise direction, the pawl slides over the teeth of the ratchet wheel, but when the arm and pawl move in the opposite direction the ratchet wheel is positively engaged, rotating the shaft 301.

The foregoing movements of the arm 315 are accomplished by connecting such arm with the crank 152 (Figs. 6, 9, 10 and 18) supporting and actuating the selector shaft centering and locking dog 151. Specifically, the crank 152 is provided with a lateral arm 317 projecting laterally through a suitably provided opening in the rear frame member 26 and having an upturned end portion supporting a pin 318 engaged in an elongated slot in a connecting member 319 fixedly secured to the lower end of the arm 315. The connecting member 319 and the slot therein are so angularly or diagonally disposed that upon vertical reciprocation of the crank arm 152 such motion is translated laterally into rotational or back-and-forth movement of the arm 315. Also, the connecting parts are so constructed that the full stroke of the crank in actuating the dog 151 moves the arm 315 only a sufficient distance to pick up one tooth of the ratchet 313, rotating the ratchet wheel one tooth at a time, in turn rotating the shaft 301 and the particular released recording wheel 302 one graduation at a time.

In the counting structure described, I preferably so relate the parts that the left-hand end wheel 302, as viewed in Fig. 18, represents the number 1 or the uppermost record of the stack and the wheel farthest to the right represents the number 16 or lowermost record in the stack, the intermediate wheels corresponding to the records numbers 2 to 15 in the sequence stated. Accordingly, in agreement with the operation of the keyboard and the movement of the selector shaft 140, the shaft 301 is rotated in a counterclockwise direction, as viewed in Fig. 7.

*Camming mechanism (Figs. 19 and 20)*

To facilitate this description, I will briefly describe the several cam members in relation to each other and their operating mechanisms. As the cycle starts, the first cam that comes into operation is the tone arm swinging cam 240 (Figs. 19 and 20). This cam, for the greater part of its circumference, is provided with a constant radius surface 240$^1$ providing a dwell adapted to hold the tone arm structure 222 in its outward, inactive position; a rising cam face 240$^2$ which, when engaged with the roller 241, swings the tone arm structure 222 outwardly; a receding cam face 240$^3$ which, when engaged by the cam roller 241, permits the tone arm actuating spring 242 to swing the tone arm inwardly to playing position; and a constant radius surface 240$^4$ at the end of the surface 240$^3$ providing a dwell holding the tone arm in initial record-engaging position until the tone arm is lowered into engagement with the record. By the time the roller 241 reaches the end of the dwell surface 240⁴, the needle 221 has been lowered into engagement with the record by the tone arm lowering cam 246 and the roller 241 has passed into a deep radial recess 240⁵ so that the tone arm is freed to move inwardly under the influence of the record grooves. By the time the roller has moved radially inward relative to the cam 240 in close proximity to but spaced from the cam surface 240⁶, it is in position ready to be picked up by the rising cam face 240² during the next rotary movement of the cam. The width of the recess 240⁵ is such as to permit a slight movement of the cam 240 before the roller is picked up by the face 240², permitting the tone arm raising cam to raise the tone arm before swinging movement by the cam surface 240² takes place. The cam 240 makes one complete revolution during each cycle of operation and the other cams on the cam shaft 51 are so shaped and coordinated with the tone arm swinging cam 240 as to cause the successive cycle of operations above stated.

The turntable elevating cam 72 is so shaped and located on the cam shaft 51 that, at the time that the roller 241 rides off of the cam face 240² onto the long, constant radius surface 240¹, it starts to raise the turntable. Specifically, the turntable elevating cam 72 is provided with a short radius surface 72¹, upon which its roller 71 rides during the time that the tone arm swinging cam 240 is riding along the surface 240² to swing the tone arm outwardly. As soon as the swinging movement of the tone arm is completed, the roller 71 engages and rides on a rising cam face 72², which is of sufficient length to raise the turntable to its extreme upper limit. The cam face 72² connects with an increased constant radius surface 72³ providing a dwell for holding the turntable in its raised position for a substantial portion of one revolution of the cam 72. After the cam roller 71 passes from the surface 72³, it engages a receding cam face 72⁴ which effects lowering of the turntable.

At the time that the turntable elevating cam 72 is rotated sufficiently to just engage its roller 71 with the constant radius surface 72³, the cam 131 for actuating the stack-splitting arms 90 and 91 picks up its roller 130 to spread the arms 90 and 91 apart. To this end, cam 131 is provided with a rising cam face 131¹, an outer constant radius face 131² and a receding cam face 131³. At the time that the turntable elevating cam engages its constant radius face 72³, the bottom of the face 131¹ engages its roller 130 and continued rotation of the cam 131 causes the arms 90 and 91 to spread apart. By the time that the constant radius face 131² is reached, the arms are fully spread apart and they are maintained in that spread-apart condition by the constant radius face 131² for a portion of the revolution of the cam shaft. When the cam roller 130 passes from face 131², it either rides along or clears the receding cam face 131³, depending upon the position of the stack-splitting arms as determined by the particular record to be played.

Just before the stack-splitting cam moves far enough to engage its roller 130 with the constant radius surface 130², the cam 155 for releasing the selector shaft locking dog 151 comes into operation. This cam 155 is of a single lobe type somewhat similar to the cam 131 and it is provided with a rising cam face 155¹ which is engaged by the roller 154 and, while the roller is riding on that face, the crank 152 actuating the dog 151 is swung in a direction to unlock the star wheel 150. This cam 155 is provided with a constant radius surface 155² upon which the roller 154 rides for a portion of the revolution of the cam shaft and, while so riding, holds the dog away from the star wheel 150, unlocking the same for the hereinabove-described selected operation of the selector-shaft rotating period. As soon as the roller 154 passes from the constant radius surface 155², it engages a receding cam face 155³, permitting the spring 156 to move the dog 151 into engagement with the star wheel 150, locking the selector shaft 140 in a selected rotating position.

While this action of the star wheel locking mechanism has been taking place, the so-called selector shaft rotating cam 162 has come into operation. This cam 162 is similar in shape to the cam 131 and its cam faces are so arranged as to effect a complete reciprocation of the sector gear 145 while the star gear locking cam 155 is holding the dog 151 away from such gear. The star locking cam is so constructed relative to this sector operating cam that when active movement of the sector is completed, the locking cam will lock the rotating shaft and the selector operating cam will complete the movement of the sector gear, restoring it to its normal condition, ready for a new cycle of operation. By this arrangement, the selector shaft 140 is positively locked against rotation before the return movement of the sector gear takes place through the operation of the sector gear operating cam 162.

By the time the foregoing sector gear operation is completed, the cam 131 operating the stack-splitting arms is released, such arms permitting the same to move inwardly to a selected position, as determined by the previous rotation of the selector shaft.

The turntable elevating cam has moved far enough by this time to bring its engaging roller 241 in position to engage the receding cam face 72⁴ on the turntable elevating cam, permitting the turntable to lower by gravity under the control of the cam to its lowermost limit.

As the turntable reaches its lowermost position, the tone arm swinging cam 240 has moved around far enough to begin movement of its roller 241 downwardly along the receding cam face 240³. When the tone arm is moved inwardly to an extent permitted by the cam face 240³, the tone arm elevating cam 246 comes into operation to effect a lowering movement of the tone arm.

The tone arm elevating cam is provided throughout the greater part of its circumference with a constant radius roller-engaging surface 246². It is also provided with a cam-raising face 246³ and a receding face 246⁴. During the operations previously described, the roller 260 cooperating with this cam for raising and lowering the tone arm, as hereinabove described, is riding along the dwell or constant radius surface 246². However, as soon as the cam shaft has rotated sufficiently to engage the tone arm swinging cam roller 241 with the constant radius surface 240⁴ of the tone arm swinging arm 239, the tone arm elevating roller 260 begins to ride along the receding face 246⁴ of the cam 246, thereby lowering the tone arm into playing engagement with the record grooves for the playing thereof. By the time that the roller 260 has traveled approximately (for example only) the length of the receding face 246⁴, the record reproducing mechanism is fully engaged in the record grooves and the machine is in condition for clutch operation to stop rotation of the cam shaft. Also, at this time, the tone arm swinging roller 241 has reached the end of the short constant radius surface 240$^4$ and, by the time the tone arm elevating roller 260 has fully reached the bottom of the receding cam face 246$^4$, the tone arm swinging roller 246 has completely cleared the cam surface 240$^4$, freeing the tone arm for inward swinging movement by the record grooves. The clutch mechanism hereinabove described is so related to its trip mechanism that, by the time the cam shaft has rotated sufficiently to bring the tone arm elevating roller to the bottom of the receding cam face 246$^4$, the clutch is operated to stop the cam shaft, leaving the roller 260 in a position wherein, upon immediate, renewed rotation of the cam shaft, it will start to rotate upwardly on the raising cam face 246$^3$ starting to lift the tone arm.

The cam shaft remains stationary during the playing of the record but, as soon as the record is played and the clutch mechanism cuts in the cam shaft, the very first operation that takes place is the actuation of the tone arm elevating roller to lift the tone arm. Immediately following the completion of the lifting operation by the cam 246, the hereinabove described switch-operating mechanism functions, leaving the parts in condition for the starting of a new cycle.

The automatic cancel cam 199 completes the cam mechanism carried by the cam shaft. This cam is shaped somewhat similarly to the tone arm elevating cam 246 and it is so related to the cam shaft and is of such shape that, at a predetermined time, it actuates the automatic cancel mechanism to cancel a selected key which has already started the remaining automatic operations of the machine in motion. This cam is so located that it so operates this mechanism immediately after the selector shaft locking dog 151 is actuated by its cam 155 to relock the selector shaft 140 after such selector shaft has been rotated to a selected position.

Résumé of operation

When the foregoing mechanism is mounted in the cabinet C, the keys 180 will be exposed at the front of the cabinet and the name of a particular musical selection, or a number representing the same, will be associated with each key thereof. Also, since the machine is coin-controlled, provision will be made in the cabinet for the insertion and reception of coins to set the magazine switch structure 289 (Fig. 10) for closing the motor switch a sufficient time to complete the cycle or number of cycles necessary to play the particular record or combination of records selected. I will now describe one cycle of operation, such as takes place when a single coin, such as a nickel, is inserted in the machine.

The user first depresses a key 180 corresponding to the record to be played. A coin is then inserted whereby the motor switch is closed, the motor 40 is started in operation, and the magazine switch 289 is set so that one reciprocation of the switch crank lever 290 will open the switch and stop the motor. The manual cancel key 202 may first be actuated to be certain that all keys 180 are restored to a nonselecting position.

At the beginning of the cycle, the turntable 60 is in its lower record-playing position and drive shaft 42 is connected with the cam shaft 51. As soon as the motor is started in operation, the tone arm, which is then in elevated position above a record, is swung outwardly to its inactive position laterally of the turntable. The turntable is then elevated to its uppermost position so that, if the record stack is split at that time, all of the records will be returned to a stacked condition upon the turntable.

After the turntable 60 has been raised to its uppermost position, the stack-splitting arms 90 and 91 are spread apart to their fullest extent in readiness to be reset by the selector mechanism for splitting the record stack to play a selected record.

The selector mechanism is so arranged that number 1 or uppermost record is selected to be played, the arms 90 and 91 are moved inwardly as the cycle continues but not far enough to engage any of the trays 80 of the stack. However, if any other record numbered from 2 to 16 is selected, the stack-splitting arms 90 and 91 are moved inwardly, under the control of the selector mechanism, a sufficient distance for such arms to engage and immovably support the record tray 80 immediately above the tray which supports the record selected for play. In that case, such arms will support one or more of the record trays stationarily in splitting the stack, depending upon the particular record selected for play, and the stack-splitting action is fully accomplished by lowering the turntable 60 to its lowermost position.

After the turntable has been raised to join the trays in a complete stack and the stack-splitting arms under the control of the selector mechanism have been set to their proper inward position, as determined by the particular pin 143 on the selector drum 142 engaged by the lug 107 on arm 90, the turntable is lowered, splitting the stack and exposing a selected record for play upon the turntable.

When the turntable is in its lowermost position, it is connected with the drive through the friction connection 49$^a$—64, which connection is such that in all raised positions the turntable is disconnected from the drive. As soon as the turntable 60 is moved to its lowermost position and is rotated by the drive mechanism, the tone arm 222 is swung laterally to a position above the first groove of the exposed record and then dropped into playing engagement with such groove. As soon as this operation has taken place and the tone arm is fully engaged with the record, the tone arm is released with the tone arm shaft 230 and the cam shaft 51 is disengaged, by the actuation of its clutch mechanism, from the driving mechanism so that the cam shaft remains at rest and the tone arm is moved inwardly solely under the control of the grooves in the record.

As the tone arm needle reaches and moves into the terminal record groove, the tone arm shaft 230 actuates the clutch-operating arm 278 to release the dog 270 for reconnecting the cam shaft 51 with the drive through the clutch device, thereby causing further rotation of the cam shaft 51, which results in raising the tone arm from the record. This action is followed by swing movement of the tone arm toward its inactive position laterally of the record stack on the turntable.

As soon as the cam shaft is again cut in, as just stated, it begins the operation of the switch-operating mechanism for opening the motor switch and stopping the motor. This action is completed upon a very slight rotational movement of the cam shaft by the clutch arm 293 engaging the link pin 294 and moving its link 291 to rotate the switch crank 290 in a counterclockwise direction as viewed in Figs. 9 and 10. This completes one cycle of operation.

Assuming that each coin unit is a nickel and the user has inserted a plurality of coin units or a single coin representing a plurality of units and has selected a corresponding number of records to be played, each coin unit represents a cycle of operation and the motor switch will not be opened until all such cycles have been completed. That is, if one coin, such as a nickel, is inserted, the motor switch will be opened at the end of one cycle under the control of the magazine switch structure hereinabove described; if two nickels or a dime is inserted, the magazine switch structure is so set that two cycles, such as above described, are required to move the magazine switch to a switch-opening position; if a quarter or five nickels, or a greater number of coins, are inserted, the number of cycles required to reset the magazine switch to open the motor switch will be the number of cycles corresponding to the nickel units that have been inserted in the machine.

As soon as the motor switch is opened, the rotation of the drive shaft is stopped, stopping the movements of the machine. Whenever the machine is so stopped, the cycle, as hereinabove mentioned, is so arranged that the tone arm will swing only partially toward its inactive position providing the time lag above mentioned as permitting the heating up of amplifier tubes, if they are used, before playing of the record starts.

It will be seen from the foregoing that when the number 1 or top record is selected for play, the stack is not split and the entire stack is supported by the turntable during the record play period, as illustrated in Figs. 2, 6 and 13. When the number 8 record, for example, is selected for play, the selector mechanism sets the stack-splitting arms 90 and 91 to pick up the number 7 tray 80, as illustrated in Figs. 7 and 14, thereby exposing the number 8 record to the reproducer mechanism as the turntable 60 drops to its lowermost position. During the play of record number 8, trays (and records) 1 to 7 are supported by the arms 90 and 91 and trays (and records) 8 to 16 are supported by the turntable. When the number 16 record is selected for play, all trays are supported by the arms 90 and 91 so that the turntable 60 moves to its lowermost record-playing position with one one record, number 16, carried thereby, as illustrated in Fig. 15.

If none of the keys 180 is depressed to select a record, the records will be played in succession, the number of records played corresponding to the coin units inserted. In other words, where no keys are depressed, the first record to be played upon starting the machine will be that immediately following the record last played just before the machine was previously stopped, and the remainder of the records will be played in forward succession. This is due to the fact that the stop shaft 172 rotates clockwise in the direction of the arrow of Fig. 19 and the pins 179 on the stop shaft 172 are arranged in a so-called left-hand spiral. For example, if the record played just before the machine was last stopped was the number 8 record, the first record to be played upon the beginning of a new cycle where no key 180 is depressed would be the number 9 record, and so on, in forward succession dependent upon the number of coins inserted. However, under these same conditions where selections are made by the depression of keys 180, the left-hand spiral arrangement of the pins on the stop shaft causes the selected records to be played in a rearward or reverse succession beginning with the record numbered immediately before the record played just before the machine was stopped. For example, if the last record played when the machine was last stopped was number 8 and the keys 180 representing the number 14, 16, 2, 3 and 5 records are depressed, number 5 record will be played first, folowed by the number 3, 2, 16 and 14 records in the succession named. The foregoing operations are insured by the automatic cancel mechanism in that the rock shaft 195 thereof is longitudinally reciprocated as soon as the selector mechanism has functioned to set the machine for the playing of the selected record, thereby permitting movement of the stop shaft 172 on to the next selection, as determined by a depressed key.

I believe that the operation and advantages of my invention will be fully appreciated from the foregoing description. It is to be understood that, while I have shown and described only one specific embodiment of my invention, other changes in details and arrangements of parts may be resorted to without departing from the spirit and scope of my invention as defined by the claims that follow.

I claim:

1. In an automatic phonograph, a turntable, a plurality of record supports arranged in a stack supported upon said turntable, means for rotating said turntable, means for raising and lowering said turntable, selectively controlled means movable to variable extents to and from said stack and adapted to engage and support the peripheral edges of said supports, and means for variably moving said selectively controlled means to and retaining it in its support-engaging position prior to lowering movement of said turntable whereby the lowering movement of said turntable splits said stack to expose a selected record thereof for play.

2. In an automatic phonograph, a turntable, a plurality of annular supports arranged in a stack on said turntable and each adapted to support a record, said supports progressively increasing in diameter from said turntable upwardly, means for rotating said turntable, means for raising and lowering said turntable to the same predetermined extent each time it is raised and lowered, stack-splitting means movable laterally only toward and from said stack of supports and having means for engaging and supporting the peripheries of said supports, and means selectively actuating said stack-splitting means to vary the extent of movement thereof toward said stack of supports whereby lowering movement of said turntable will cause said stack-splitting means to engage and support the periphery of a selected one of said supports as the turntable moves downwardly to split the stack and expose a selected one of said records for play.

3. In an automatic phonograph, a turntable, a plurality of record supports normally supported in stacked relation upon said turntable and progressively increasing in width from said turntable upwardly, means for raising said turntable from and lowering it toward a record-playing position, means disposed along the path of movement of said turntable and adjustable angularly of the axis of the turntable to engage and support any one of said record supports as said turntable is lowered therepast, and means for adjusting said latter means to a position laterally of said supports to permit said stack in its entirety to pass thereby or to a particular position at which said adjustable means is adapted to engage a particular one of the record supports of said stack as said turntable is lowered therepast and stationarily support the same and the record supports thereabove as said turntable is finally lowered to its record-playing position.

4. In an automatic phonograph, a plurality of record carriers supported in stacked relation upon said turntable and each adapted to support a record, the carrier next adjacent said turntable being of least diameter with the other carriers progressively increasing in diameter to provide a stack of inverted frusto-conical shape, means for raising said turntable from and lowering it toward a record-playing position, means located on the opposite sides of said stack and mounted for movement between fixed limits toward and from said turntable whereby such means is adapted to engage the peripheral edge of any one of said carriers, means selectively controlled for moving said carrier-engaging means inwardly to variable extents to dispose the same in the path of any one of said carriers or outside the path of all of the same, the arrangement being such that when said carrier-engaging means is disposed in the path of any certain record carrier, lowering movement of said turntable engages that particular carrier with said means splitting the stack and exposing a certain record for play upon said turntable.

5. In an automatic phonograph, a rotatable turntable, a plurality of record carriers, each adapted to support a record, mounted in stacked relation upon said turntable, said carriers being so shaped that they form a stack of inverted frusto-conical shape, means for raising and lowering said turntable, and selectively controlled means located above the turntable and adjustable toward and from the turntable axis to interpose the same in the path of the edge of none or any one of said record carriers, whereby lowering movement of said turntable is operative to engage said means with a record carrier for support of the latter and any carriers of the stack thereabove to split said stack and expose a record for play as said turntable moves to its lowermost position.

6. In an automatic phonograph, a turntable, a plurality of records arranged in an inverted frusto-conical stack supported upon said turntable, means for rotating said turntable, means for raising and lowering said turntable, and means for splitting said stack during the lowering movement of said turntable which comprises a pair of members located on opposite sides of said turntable and adapted to be moved toward and from the record stack to engage and support a portion thereof upon lowering movement of said turntable, and selective means operative to variably adjust said arms to a position to engage and support, upon lowering movement of said turntable, that portion of the stack immediately above a record selected for play, whereby lowering movement of said turntable after said arms are engaged with the stack will split the stack and expose the selected record for play.

7. In an automatic phonograph, a plurality of record carriers supported in stacked relation upon said turntable and adapted to support a record, the carrier next adjacent said turntable being of least diameter with the other carriers progressively increasing in diameter to provide a stack of inverted frusto-conical shape, means for raising said turntable from and lowering it toward a record-playing position, stack-splitting means including a pair of members mounted on the opposite sides of said turntable and movable in aligned paths toward and from the axis of said turntable, said members having means for engaging and supporting the peripheral edges of said carriers, and selector mechanism operative to position said members in a predetermined inward position to engage the periphery of the carrier immediately above the carrier supporting the record selected for play, whereby as the turntable and stack are lowered past said members that portion of the stack above the record selected for play is supported by said members and the other portion of the stack is supported by said turntable with the selected record exposed for play in the lowermost position of said turntable.

8. In an automatic phonograph, a turntable, means for rotating said turntable, means for raising and lowering said turntable, a plurality of record carriers arranged in stacked relation supported by said turntable, said carriers progressively increasing in diameter from said turntable upward to provide an arrangement wherein the edges of separate carriers move in separate vertical paths located progressively farther away from the turntable axis, and stack-splitting means cooperative with said carriers including a pair of upstanding members on diametrically opposite sides of said turntable and mounted for movement toward and from the axis of said turntable whereby the opposite peripheral edge portions of any one of said carriers may be engaged, means for moving said members toward and from the axis of said turntable, and selectively set means for stopping the inward movement of said members in the path of movement of the edge of any one of said carriers so that the stack is split by lowering movement of said turntable thereby exposing for play the record immediately below the engaged carrier.

9. In an automatic phonograph, a turntable, means for raising the turntable from and lowering it toward a record-playing position, a plurality of record carriers arranged in stacked relation upon the turntable, said carriers progressively increasing in diameter from the turntable upwardly providing a stack of inverted frusto-conical shape, means movable toward the stack of records for engaging a certain one of said carriers as said turntable is lowered for splitting the stack to expose a selected record for play, selector mechanism adapted to selectively determine the extent of inward movement of said stack-splitting means to cause the latter to engage any one of said record carriers to expose a selected record for play, and operating mechanism including control elements for actuating said selector mechanism and said stack-splitting means in the order mentioned.

10. In an automatic phonograph, a turntable, means for raising the turntable from and lowering it toward a record-playing position, a plurality of record carriers arranged in stacked relation upon the turntable, said carriers progressively inceasing in diameter from the turntable upwardly providing a stack of inverted frusto-conical shape, stack-splitting means for exposing a selected record for play including a pair of members mounted on diametrically opposite sides of said turntable and adapted for movement toward and from said turntable whereby the peripheral edges of said carriers may be engaged to support the latter, said members being coupled together in such a manner that movement of one controls the movement of the other, means for moving said members toward and from the axis of said turntable whereby to engage the peripheral edge of any one of said carriers to split the stack and expose a record for play upon lowering movement of the turntable, and record selector mechanism including a plurality of stop elements one for each record in the stack engageable by one of said members, and means for moving the stop element corresponding to the record selected for play into the path of said one member for positioning said members to engage the record carrier immediately above the record selected for play and split the stack to expose the selected record for play as the turntable is lowered.

11. In an automatic phonograph, a turntable, means for raising the turntable from and lowering it toward a record-playing position, a plurality of record carriers arranged in stacked relation upon the turntable, said carriers progessively inceasing in diameter from the turntable upwardly providing a stack of inverted frusto-conical shape, stack-splitting means for exposing a record for play comprising a pair of diametrically opposed upstanding arms mounted on the opposite sides of said turntable for slide movement toward and from the axis of the latter and having elements at their upper ends for engaging and supporting the peripheral edges of said carriers against lowering movement, means for moving said arms simultaneously inward and outward to similar extents, means for limiting the inward movement of said arms to variable extents to engage any one of said carriers and split the record stack to expose a record selected for play as said turntable is lowered, and selective means for controlling said limiting means.

12. In an automatic phonograph, a turntable, means for raising the turntable from and lowering it toward a record-playing position, a plurality of record carriers arranged in stacked relation upon the turntable, said carriers progressively increasing in diameter from the turntable upwardly providing a stack of inverted frusto-conical shape, stack-splitting means for exposing a record for play comprising a pair of diametrically opposed upstanding arms mounted on the opposite sides of said turntable for slide movement toward and from the axis of the latter and having provision at their upper ends for engaging and supporting the peripheral edges of said carriers, said members being so constructed that movement of one controls movement of the other simultaneously and to similar extent, means for moving said arms simultaneously inward and outward to similar extents, and selector mechanism controlling the extent of inward movement of said arms to engage a particular record carrier and split the record stack as the turntable is lowered to record-playing position to expose a selected record on the turntable for play, said mechanism including a shaft, a helically disposed row of stop elements spaced apart along the path of movement of one of said arms and corresponding to the records in the stack, means for rotating said shaft to move said stop elements successively into the path of said one arm, and selectively actuated stop means for stopping rotation of said shaft to position a particular stop element in the path of said one arm to position both of said arms to engage the record carrier immediately above the record corresponding to the engaged stop element.

13. Selector mechanism for an automatic phonograph of the type having a turntable supporting a stack of record carriers thereon, which comprises carrier-engaging members, means for moving said carrier-engaging members toward and from the axis of said carriers, a selector shaft having a plurality of stop elements thereon each adapted to be moved by rotation of said shaft to a position where it is adapted to be engaged by at least one of said carrier-engaging members, means for rotating said selector shaft, means for variably stopping rotation of said selector shaft to position a selected one of said stop elements in a position adapted to be engaged by said carrier-engaging members, said shaft-stopping means including a stop shaft directly connected to and rotated by said selector shaft and having thereon stop elements corresponding to said stop elements on the selector shaft, a plurality of stop members disposed along the axis of said stop shaft, one for each of said stop elements on the stop shaft, and each individually adjustable to a position to be engaged by the related stop element on said stop shaft as the stop shaft is rotated by the selector shaft.

14. Selector mechanism for an automatic phonograph of the type having a turntable supporting a stack of record carriers, which comprises carrier-engaging members, means for moving said carrier-engaging members toward the axis of said carriers to engage the latter, a selector shaft having a plurality of stop elements thereon axially and circumferentially spaced apart, each adapted to be moved by rotation of said shaft to a position where it is adapted to be engaged by at least one of said carrier-engaging members, means for rotating said selector shaft, means for variably stopping rotation of said selector shaft and adapted to position different stop elements in the path of said carrier-engaging members, said shaft-stopping means including a longitudinally shiftable stop shaft connected to said selector shaft for direct rotation by the latter, a plurality of depressible keys, each representing a particular record of the stack, located in keyboard form along the axis of said stop shaft, stop members, one for each said key, actuated by said keys to and held in a stop position, stop elements on said stop shaft, one for each said stop member, movable to engage the corresponding stop member by rotation of said stop shaft when said corresponding stop member is in stop position, and means operative to longitudinally shift said stop shaft to move said stop members out of the path of said stop shaft elements and to return said keys to a raised position.

15. Selector mechanism for an automatic phonograph which comprises a rotatable selector shaft having a plurality of axially and circumferentially spaced selector elements thereon, means for stopping said shaft in different rotary positions to position different ones of said elements in the same position circumferentially of said shaft, and means for rotating said shaft including a gear rotatably mounted upon said shaft, means for rotating said gear in opposite directions, a friction drum fixedly mounted upon said shaft, and a shoe element fixedly carried by said gear and frictionally engaged with said drum and adapted to slip thereon when rotation of said shaft is stopped to permit continued rotation of said gear without affecting the position of said shaft, a wheel member fixed to said shaft and having a plurality of notches in its periphery, one for each said rotary position of said shaft, a locking member engageable with the notches of said wheel, and means for moving said member to engage a notch in said wheel after said shaft has been stopped by said stop means and for releasing said member from said wheel immediately prior to rotation of said shaft by its rotating means.

16. Selector mechanism for an automatic phonograph, which comprises a rotatable selector shaft, means for stopping said shaft in different rotary positions, and means for rotating said shaft including a gear rotatably mounted on said shaft, a friction drum fixedly mounted on said shaft, a shoe member carried by said gear and engageable with said drum to normally drive said shaft by said gear and to slip and permit the gear to rotate relatively to said shaft when the latter is stopped, a reciprocable sector gear for rotating said gear in opposite directions, and cam-operated means drive-engaged with said sector gear for reciprocating the same.

17. In an automatic phonograph, record-selecting mechanism including key-actuated stop members corresponding to the records to be played, and adapted to be moved from a nonstop to a stop position, a rotatable stop shaft having stop elements thereon corresponding to said stop members and adapted to engage the stop members, respectively, when the latter are in their stop position, said shaft being mounted for axial shift movement, and means for so shifting said shaft for record-canceling purposes which includes a member having a crank element rotatably supported in engagement with the end of said stop shaft, cam means for rotating said member to shift said shaft axially in one direction, and spring means for shifting said shaft in the opposite direction, said stop members and elements being so relatively shaped and located that axial shift movement of said shaft and elements shifts any stop member then engaged by a stop element to its nonstop position.

18. In an automatic phonograph, a turntable adapted to support a plurality of record carriers in stacked relation thereon, means movable toward and from said carriers to variable extents for engaging the periphery of a selected one of said carriers as said turntable is lowered to stop movement of said engaged carrier and those thereabove for splitting the stack of records to expose a selected record for play, means for rotating said turntable including a spindle secured to the turntable and supported for both up and down slide and rotational movements, a friction drive element on said spindle below the turntable and having a friction face concentric with said spindle, rotary drive means including a friction element with respect to which said spindle moves and which is adapted to be engaged by the spindle friction element in the lowermost position of the turntable under the weight of said spindle, turntable and record stack, means engaging said spindle for raising and lowering said spindle and turntable thereby disconnecting and connecting, respectively, the turntable with the drive means, the arrangement being such that said turntable is not rotated in its raised position, and means for operating said stack-splitting means for the stack-splitting operation after the turntable is in a raised, nonrotating position disconnected from the drive means.

19. In an automatic phonograph, a turntable upon which a record is adapted to be supported for play, drive means for rotating said turntable including an electric motor, record changing means including a shaft adapted to be connected at intervals to said drive means for rotation thereby, means for connecting said shaft to said drive means, means controlling the operation of said motor including a switch unit having a switch-operating element adapted to open a switch by movement thereof in one direction, a longitudinally shiftable member connected to said element and shiftable in one direction to move said element in switch-opening direction, means operated from said shaft connecting means and adapted in one rotary position thereof to engage said member and shift it in switch-opening direction upon continued rotation of said shaft, and spring means for yieldably opposing the switch-operating shift movement of said member and for returning said member and said element in an opposite direction to their normal nonshifted position upon further and predetermined rotation of said shaft after said shift movement is completed.

20. In an automatic phonograph, a turntable upon which a stack of records is supported for play, drive means for rotating said turntable including an electric motor, means for shifting said turntable in axial direction, means for engaging the stack of records and splitting the same as said turntable is moved in one axial direction, means for operating said stack-splitting means including a shaft adapted to be connected at intervals to said drive means and at other intervals to be disconnected therefrom, means controlling the operation of said motor including a switch unit having a switch-operating element adapted to open a switch by movement thereof in one direction, a member connected to said element and shiftable longitudinally in one direction to move said element in switch-opening direction, drive connecting means carried by said shaft and adapted in one rotary position thereof to engage said member and shift it longitudinally in switch-opening direction as its rotation is continued and to longitudinally be released from said member upon continued rotation after said member and said element are moved to switch-opening position, spring means for yieldably opposing said shift movement of said member and for returning it to its normal nonshifted position upon rotation of said shaft sufficiently to release said member, and means operably engaged with said shaft during its disconnected intervals and preventing backlash therein at that time.

21. In an automatic phonograph, a turntable, drive mechanism including a motor for rotatably driving said turntable, means for controlling the operation of said motor including a switch structure having a switch-opening lever, a tone arm swingable both vertically and horizontally relative to said turntable, a cam mechanism for operating said tone arm and including a shaft rotatably driven at intervals by said drive means, and means for actuating said switch-opening lever which includes a drive-connecting member located on said shaft, a shift member connected at one end to said lever and adapted to be shifted longitudinally, said shift and drive-connecting members being so relatively located that a part of the drive-connecting member engages the other and moves it to switch-opening position to stop said motor at the rotary position of said shaft wherein the tone arm operating mechanism is moving said tone arm outwardly relative to said turntable.

22. In an automatic phonograph, a turntable, drive mechanism including a motor for rotatably driving said turntable, means for controlling the operation of said motor including a switch structure having a switch-opening lever, a tone arm swingable both vertically and horizontally relative to said turntable, a cam mechanism for operating said tone arm and including a shaft rotatably connected to and driven by said drive means at certain intervals and disconnected from said motor at other intervals so that it remains stationary, and means for actuating said switch-opening lever which includes a drive-connecting member located on said shaft and having a lever operating part, a shift member connected at one end to said lever and adapted to be shifted longitudinally, said members being so relatively located that the lever operating part of the drive-connecting member engages the other member and moves it in switch-opening position to stop said motor at the rotary position of said shaft wherein the tone arm operating mechanism is moving said tone arm outwardly relative to said turntable, and means for locking said shaft against rotation for preventing kick-back or reversal of movement of said shaft when it is disconnected from said motor.

RUSSELL I. WILCOX.